US006952394B1

(12) United States Patent
Kim et al.

(10) Patent No.: US 6,952,394 B1
(45) Date of Patent: Oct. 4, 2005

(54) METHOD FOR TRANSMITTING AND RECEIVING ORTHOGONAL FREQUENCY DIVISION MULTIPLEXING SIGNAL AND APPARATUS THEREFOR

(75) Inventors: Yung-soo Kim, Yongin (KR); Ji-hoon Park, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/576,767

(22) Filed: May 24, 2000

(30) Foreign Application Priority Data

| May 25, 1999 | (KR) | ................................ 1999-18852 |
| Feb. 18, 2000 | (KR) | ................................. 2000-7875 |

(51) Int. Cl.$^7$ .............................................. H04J 11/00
(52) U.S. Cl. ..................................... 370/208; 370/210
(58) Field of Search ............................... 370/203, 208, 370/210, 286; 375/350, 232, 260

(56) References Cited

U.S. PATENT DOCUMENTS

| 5,406,551 | A |   | 4/1995 | Saito et al. |
| 5,610,908 | A |   | 3/1997 | Shelswell et al. |
| 5,623,513 | A |   | 4/1997 | Chow et al. |
| 5,687,165 | A | * | 11/1997 | Daffara et al. ............... 370/208 |
| 5,732,068 | A |   | 3/1998 | Takahashi et al. |
| 5,771,223 | A |   | 6/1998 | Kimura et al. |
| 5,771,224 | A |   | 6/1998 | Seki et al. |
| 5,774,450 | A |   | 6/1998 | Harada et al. |
| 5,787,113 | A |   | 7/1998 | Chow et al. |
| 5,867,478 | A | * | 2/1999 | Baum et al. ................. 370/203 |
| 5,912,876 | A |   | 6/1999 | H'Mimy |
| 5,914,933 | A | * | 6/1999 | Cimini et al. ............... 370/208 |
| 6,631,175 | B2 | * | 10/2003 | Harikumar et al. ......... 375/350 |

FOREIGN PATENT DOCUMENTS

| EP | 0 822 690 | 2/1998 |
| EP | 0849919 | 6/1998 |
| EP | 0 869 647 | 10/1998 |
| KR | P1999-012057 | 2/1999 |

OTHER PUBLICATIONS

Y. Zhang et al. "OFDM Peak Power Reduction by Sub-Block-Coding and Its Extended Versions", Vehicular Technology Conference, 1999 IEEE, pp. 695-699.

(Continued)

*Primary Examiner*—Huy D. Vu
*Assistant Examiner*—Daniel Ryman
(74) *Attorney, Agent, or Firm*—Buchanan Ingersoll PC

(57) ABSTRACT

A method for transmitting orthogonal frequency division multiplexing (OFDM) signals including coding the OFDM signals; forming a block of N coded data and dividing the block into L M-sized small blocks; M-point inverse fast Fourier transforming the L small blocks; combining the transformed blocks to generate an N-sized inversely-transformed block; attaching a cyclic prefix to the N-sized block; and transforming the blocks into an analog signal; and transmitting the analog signal. A method of receiving OFDM signals including digitally converting received OFDM signals and obtaining a samples from the transformed signals; detecting the starting point of an N-sized signal sample block from the samples; dividing the signal sample block into L M-sized small blocks M-point fast Fourier transforming the L small blocks; combining the transformed small blocks to generate an N-sized transform block; detecting data from the generated block, and decoding the detected data. N, M and L are integers of 1 or more and L= N/M.

29 Claims, 13 Drawing Sheets

OTHER PUBLICATIONS

Abstract of 00304438.5.

Leke, A., et al., *Impact of Imperfect Channel Knowledge on the Performance of Multicarrier Systems*, Proc of Globecom '98, 1998, pp. 951-955.

Jones, A.E., et al., *Block Coding Scheme For Reduction Of Peak To Mean Envelope Power Ratio Of Multicarrier Transmission Schemes*, ELECTRONICS LETTERS, Dec. 1994, vol. 30, No. 25, pp. 2098-2099.

Muller, S., et al., *A Comparison of Peak Power Reduction Schemes for OFDM*, Proc. Of Globecom '97, 1997, pp. 1-5.

Chow, J., et al., *Mitigating Clipping Noise in Multi-carrier Systems*, Proc. of ICC '97, 1997, pp. 715-719.

van Nee, R., *OFDM Codes for Peak-to-Average Power Reduction and Error Correction*, Proc. of Globecom '96, 1996, pp. 740-744.

Tufvesson, F., et al., *Pilot Assisted Channel Estimation for OFDM in Mobile Cellular Systems*, Vehicular Technology Conference, 1997, pp. 1639-1643.

Shepherd, S.J., et al., *Simple Coding Scheme to Reduce Peak Factor in QPSK Multicarrier Modulation*, ELECTRONICS LETTERS, Jul. 1995, vol. 31, No. 14, pp. 1131-1132.

\* cited by examiner

VIRTUAL PILOT : $|P_{128}| = (|P_{120}|+|P_{136}|)/2$

METHOD FOR TRANSMITTING AND RECEIVING ORTHOGONAL FREQUENCY DIVISION MULTIPLEXING SIGNAL AND APPARATUS THEREFOR

BACKGROUND OF THE INVENTION

1. Field of the Invention

The present invention relates to a signal transmitting method and apparatus, and more particularly, to a signal transmitting method and apparatus by which an orthogonal frequency division multiplexing (OFDM) method is improved.

2. Description of the Related Art

As a transmission rate is increased when data is transmitted through a wire or wireless channel, multipath fading or intersymbol interference (ISI) is increased, so that reliable data transmission cannot be expected. Orthogonal frequency division multiplexing (OFDM) and discrete multitone (DMT) are resistant to the multipath fading and ISI and their band efficiencies are high, so that they are adopted in the signal transmitting method of a digital audio broadcast (DAB) and digital television (TV) in Europe, and they are used for an asymmetric digital subscriber line (ADSL) and a universal asymmetric digital subscriber line (UADSL) in U.S.A.

FIG. 1 shows a typical OFDM signal transmitting procedure. A series of input data bits $b_n$ is encoded to sub-symbols $X_n$ by an encoder 102. A series of $X_n$ is converted to N-sized vectors or blocks by a serial-to-parallel converter 104. A pilot tone adder 105 adds M pilot tones Pi (i=1, ..., M) to $X_n$ to achieve channel estimation in a receiving side. The output of the pilot tone adder 105 is N-point inverse fast Fourier transformed by an N-point inverse fast Fourier transformer (N-IFFT) 106, to N time domain signal $x_k$. Here, n indicates a frequency domain index, and k indicates a time domain index.

$$x_k = \frac{1}{N}\sum_{n=0}^{N-1} X_n e^{j2\pi kn/N}, k = 0, \ldots, N-1 \quad (1)$$

A parallel-to-serial converter 108 transforms the vectors or blocks composed of N elements to a series of time domain signals $x_k$. A cyclic prefix adder 110 copies the last G signals from the N signals and attaches them to the front of the N signals. The G signals are referred to as cyclic prefix. (N+G) signal samples compose an OFDM symbol block in a time domain. The OFDM symbol block is consecutively converted to analog signals through a digital-to-analog converter 112, and the converted analog signals are output after an intermediate frequency (I/F) process and a radio frequency (R/F) process. The above-described procedure is typical for signal transmission in an OFDM system. Here, the position of the encoder 102 may be exchanged with the position of the serial-to-parallel converter 104.

FIG. 2 shows a typical procedure for receiving OFDM signals. The received analog signals are converted to a base band signal r(t) through an R/F process and an I/F process, and the analog signals are sampled through an analog-to-digital converter 202 to convert the base band signal r(t) to a digital signal $r_k$. A cyclic prefix remover 204 detects the starting of the OFDM symbol block from the received signals to remove the cyclic prefix, and then outputs N signal samples. The serial-to-parallel converter 206 converts a series of signal samples to N-sized vectors or blocks and outputs the N-sized vectors or blocks to an N-point fast Fourier transformer (N-FFT) 208. The N-FFT 208 transforms time domain signal $r_k$ to a frequency domain signal $R_n$.

$$R_k = \sum_{n=0}^{N-1} r_k e^{-j2\pi kn/N}, n = 0, \ldots, N-1 \quad (2)$$

The $R_n$ can also be expressed by the following Equation 3:

$$R_n = X_n \cdot H_n + I_n + W_n \quad (3)$$

wherein $X_n$ denotes data including data and a pilot tone $P_i$, $H_n$ denotes a channel response, $I_n$ denotes intercarrier interference, and $W_n$ denotes additive white Gaussian noise (AWGN).

A channel estimator 209 can obtain M channel responses from the output $R_n$ of N-FFT 208 using the already-known pilot tone $P_i$ as in Equation 4:

$$\dot{H}_{n,i} = \frac{R_{n,i}}{P_i} = H_{n,i} + \frac{[I_{n,i} + W_{n,i}]}{P_i}, \quad (4)$$

$$i = 1, \ldots, M, n = 1, \ldots, N$$

The channel estimator 209 estimates a channel distorted by linear interpolating a channel response of data symbols, from $\dot{H}_{n,j}$.

A frequency domain equalizer (FEQ) 210 compensates for signal deformation generated by the channel with respect to the output $R_n$ of the N-FFT 208, using the output of the channel estimator 209 as the tap coefficient of the FEQ 210 for each frequency index n.

A detector 212 detects an original sub-symbol $\hat{X}_n$ from the output $Z_n$ of the FEQ 210. The parallel-to-serial converter 214 converts the N-sized vectors to a series of signals, and a decoder 216 decodes a bitstream of data $\hat{b}_n$. The above-described processes are typical for receiving signals of the OFDM system. Here, the position of the parallel-to-serial converter 214 may be exchanged with the position of the decoder 216. Also, the detection by the detector 212 and the decoding by the decoder 216 may be performed in one step.

Several sub-symbols $X_n$ are added as shown in Equation 1, so that the time domain OFDM signal $x_k$ has a Gaussian distribution according to the central limit theorem. As a result, the peak-to-average power ratio (PAR) of the signal is very high.

FIG. 3 shows the amplitude of the time domain OFDM signal when N=256 and $X_n$ is a quadrature phase shift keying (QPSK) symbols. When the PAR is high, clipping or severe quantization noise may occur in the digital-to-analog converter of a transmission terminal. When signals are transmitted, clipping and non-linear distortion may occur in a high power amplifier (HPA) of the R/F stage to thereby rapidly deteriorate performance. If a HPA is restricted to operate at a low power intentionally to avoid this problem, the efficiency of the HPA and total system performance can be deteriorated.

The PAR of a jth OFDM symbol $x_{j,k}$ is defined as follows.

$$\zeta_j = \frac{\max_{0 \le k \le N} |x_{j,k}|}{\sigma_x} \quad (5)$$

The peak power of the time domain OFDM signal is different in every symbol, so that the PAR can not be obtained beforehand and only the statistical characteristics can be obtained. FIG. 4 shows the probability $\Pr\{\zeta_j > \zeta_0\}$ of the PAR values of the OFDM system being higher than a predetermined value $\zeta_0$ when N is changed to 2, 4, 8, 16, . . . , 1024.

A maximum PAR generated by the OFDM system can be easily obtained through Parseval's theorem. The maximum PAR generated by the OFDM signal having N sub-symbols is as follows.

$$\zeta_j = \frac{\max_{j, 0 \le k \le N} |x_{j,k}|}{\sigma_x^2} \quad (6)$$

Here, $\sigma_x^2$ indicates variance of the time domain signals.

$$\max_{j, 0 \le k \le N} |x_{j,k}| = \max_n |X_n| = C \quad (7)$$

$$\sigma_x^2 = \sigma_x^2/N \quad (8)$$

Here, $\sigma_x^2$ is the variance of the frequency domain signal $X_n$, and $\max_n |X_n| = C$ can be obtained by the constellation of the sub-symbol $X_n$. Thus, the PAR of Equation 5 can be obtained as follows.

$$\zeta = \sqrt{N} \zeta_X \quad (9)$$

Here, $\zeta_X = C/\sigma_X$ indicates a PAR of the given sub-symbol $X_n$, and is also the PAR of the conventional single carrier method since this method allows symbols to be transmitted without any conversion. Thus, Equation 9 shows a difference in PARs between the signal of the OFDM system obtained by the multi-carrier method and the signal of the conventional single carrier method.

In the conventional OFDM system, an N-point IFFT/FFT is used, so that the PAR of the signal is very great. Thus, various methods for reducing the PAR of the OFDM signal have been developed. The conventional algorithm for reducing the PAR of the OFDM signal is simple and very effective when the size N of the OFDM symbol is small, however, inappropriate for when N is large. In the algorithm adopted when N is large, as the PAR decreases much, the complexity and the information loss are increased.

Methods for reducing the PAR of the OFDM signals using coding are disclosed in papers "Block Coding Scheme for Reduction of Peak to Mean Envelope Power Ratio of Multi-Carrier Transmission Schemes", Electronics latters, vol. 30, No. 25, pp. 2098~2099, December 1994, by A. E. Jones, T. A. Wilkinson and S. K. Barton, "Simple Coding Scheme to Reduce Peak Factor in QPSK Multicarrier Modulation", electronics letters, vol. 31, No. 14, pp. 113~114, July 1995, by S. J. Shepherd, P. W. J. van Eetvelt, C. W. Wyatt-Millington and S. K. Barton, and "OFDM Codes for Peak-to-Average Power Reduction and Error Correction", proc. of Globecom '96, pp. 740~744, London, November 1996, by Richard D. J. van Nee. But, the above methods cannot be adopted for an OFDM symbol for which N is greater than 16.

A reduction in noise by a reduction in the amplitude of a signal is obtained by U.S. Pat. Nos. 5,787,113 and 5,623,513 "Mitigating Clipping and Quantization Effects in Digital Transmission Systems", and papers "Mitigating Clipping Noise in Multi-Carrier Systems", proc. of ICC, '97, PP. 715~719, 1997. But, the above method requires a reduction in the amplitude of the signal, so that the signal to noise ratio of the receiving terminal is reduced, and the reduction in the PAR is not great.

In U.S. Pat. No. 5,610,908 entitled "Digital Signal Transmission System Using Frequency Division Multiplexing", the phase of a desired frequency domain signal is restored to an initial phase, and signals around band edges are attenuated, in order to reduce the peak power value. However, this method is disadvantageous in that as peak power is reduced, more-information is lost.

A method for determining a value appropriate for a redundant frequency index to eliminate the peak of a time domain OFDM signal is disclosed in references "Clip Mitigation Techniques for T1.413 Issue3", T1E1. 4/97-397, December 1997, by Allan Gatherer and Michael Polley, and "PAR Reduction in Multi-Carrier Transmission Systems", T1E1.4 VDSL, T1E1.4/97-367, Dec. 8, 1997, by Jose Tellado and John M. Cioffi. Here, in order to increase reduction in peak power, the redundant frequency must be increased and thus information loss must be increased.

Two methods for changing the frequency domain phase of the OFDM signal to reduce the time domain peak power are compared in reference "A Comparison of Peak Power Reduction Schemes for OFDM", proc. of Globecom '97, pp. 1–5, 1997, by Stefan H. Muller and Johannes B. Huber. By these methods, a hardware configuration becomes complicated because various N-point IFFTs should be simultaneously performed. Information loss can be generated because phase change information must be transmitted together with data. Information in the phase change must be exactly detected by the receiving terminal.

In the conventional single carrier transmission method, PAR is not great and thus the above-described problems of the OFDM system are not generated. By the conventional single carrier method, an equalizer is trained and operated in the time domain. When the data transmission rate is increased, signal interference by a channel is rapidly increased, so that the number of equalizer taps of the receiving unit must be increased. At this time, the training of the equalizer requires much time and the operation thereof is complicated. However, the FEQ of the OFDM system is trained and operated in the frequency domain, where one tap is required per frequency and training and operation are very simple. Thus, the OFDM method is appropriate for high-speed data transmission. But, the PAR of the OFDM signal is great so that it is difficult for the OFDM method to be utilized.

In the OFDM system, a transmission signal received via channel, is distorted by the characteristics of the channel and the influence of AWGN or the like, so that an accurate channel estimation is required to detect a transmitted signal from the distorted received signal. In particular, under a channel environment having severe fading, a channel changes more rapidly, so much transmission information cannot be decoded if the channel is not properly estimated.

A. Leke and John. M. Cioffi ["Impact of Imperfect Channel Knowledge on the Performance of Multicarrier Systems", GLOBECOM'98] discloses a signal-to-noise ratio (SNR) in the case in which an accurate channel estimation is not achieved in the OFDM system, and emphasizes the importance of channel estimation. However, this paper does not mention the details of a channel estimation method.

An existing method for estimating a channel in the OFDM system includes a method using a reference symbol or a method using a pilot tone. U.S. Pat. No. 5,771,223, entitled "Method of Receiving Orthogonal Frequency Division Multiplexing Signal and Receiver Thereof" discloses a method using a reference symbol, and U.S. Pat. No. 5,771,224, entitled "Orthogonal Frequency Division Multiplexing Transmission System and Transmitter and Receiver Thereof" discloses an invention for estimating a channel using a reference symbol and a null symbol. The method of estimating a channel using a reference symbol is appropriate for an environment having little change in the characteristics of the channel, but causes many channel estimation errors in a channel environment having severe fading.

In U.S. Pat. No. 5,406,551, entitled "Method and Apparatus for Digital Signal Transmission using Orthogonal Frequency Division Multiplexing", a pilot tone is added to data at regular intervals and transmitted in an already-known frequency domain, and, in the receiving stage, the pilot tone is detected in the frequency domain, and the degree of attenuation of a channel is estimated by linear interpolation and compensated for. Linear interpolation, which is a general channel estimation method using a pilot tone, is suitable for the environment where a channel change is slow. However, when the channel change becomes severe, much fluctuation occurs between pilot tones added at regular intervals in the frequency domain in the transmitting stage, thus making a channel estimation error worse. This problem can be overcome by U.S. Pat. No. 5,774,450 entitled "Method of Transmitting Orthogonal Frequency Division Multiplexing Signal and Receiver Thereof", paper of F. Tufvesson and T. Maseng ["Pilot Assisted Channel Estimation for OFDM in Mobile Cellular Systems, Vehicular Technology Conference, 1997], paper of M. J. F. Garcia, J. M. Paez-Borrallo and S. Zazo ["Novel Pilot Patterns for Channel Estimation in OFDM Mobile Systems over Frequency Selective Fading Channels", PIMRC, 1999], which disclose deformation of a pilot tone to reduce channel estimation error in an environment having a serious channel change while using linear interpolation.

U.S. Pat. No. 5,912,876, entitled "Method and Apparatus for Channel Estimation", and U.S. Pat. No. 5,732,068, entitled "Signal Transmitting Apparatus and Signal Receiving Apparatus using Orthogonal Frequency Division Multiplexing", are related to an encoded pilot signal generator and a clock/pilot signal generator, respectively. In these references, a pilot signal is generated by encoding, and is added to the time domain output signal of an N-IFFT in the transmitting step and transmitted. These references can obtain a better channel estimation performance than other inventions because of a margin obtained by encoding. However, these references do not consider the PAR at all, so that many problems are generated in actual system implementation.

SUMMARY OF THE INVENTION

To solve these problems, an object of the present invention is to provide an orthogonal frequency division multiplexing (OFDM) signal transmitting and receiving method and apparatus by which the PAR is greatly reduced compared to a typical OFDM method and an equalizer is simplified compared to a typical single carrier method.

Another object of the present invention is to provide an OFDM signal transmitting and receiving apparatus and method by which a pilot signal is added to a transmission signal in the time domain at a transmitting terminal, and a channel is estimated by inserting a virtual pilot tone into the received signal of the frequency domain at a receiving terminal.

To achieve the first object, the present invention provides a method for transmitting OFDM signals, the method including: (a) coding the OFDM signals; (b) forming a block of N coded data and dividing the block into L M-sized small blocks, where N, M and L indicate integers of 1 or more, and L=N/M; (c) M-point inverse fast Fourier transforming the L small blocks; (d) combining L M-point inverse fast Fourier transformed blocks, and generating an N-sized inversely-transformed block; (e) attaching a cyclic prefix to the N-sized inversely-transformed block; and (f) transforming the blocks having the attached cyclic prefix, into an analog signal and transmitting the transformed analog signal.

To achieve the first object, the present invention provides a method of receiving OFDM signals, the method including: (a) digitally converting received OFDM signals and obtaining a signal sample from the transformed signals; (b) detecting the starting point of an N-sized signal sample block from the signal samples, and removing a cyclic prefix; (c) dividing the signal sample block into L M-sized small blocks, where N, M and L are integers of 1 or more, and L=N/M; (d) M-point inverse fast Fourier transforming the L small blocks; (e) combining the L M-point inverse fast Fourier transformed small blocks, and generating an N-sized transform block; and (f) detecting data from the N-sized transform block, and decoding the detected data.

To achieve the first object, the present invention provides an apparatus for transmitting signals includes apparatus for transmitting OFDM signals, the apparatus including: an encoder for encoding OFDM signals; a transmission deinterleaver for forming N encoded code data into a block, and dividing the block into L M-sized small blocks, where N, M and L are integers of 1 or more, and L=N/M; L M-point inverse fast Fourier transformers for M-point inverse fast Fourier transforming the L small blocks; a signal transmission interleaver for coupling L M-point inverse fast Fourier transformed small blocks, thereby generating an N-sized inverse transformed block; a cyclic prefix adder for adding a cyclic prefix to the N-sized inversely transformed block; and a digital-to-analog converter for analog-transforming the inversely-transformed block to which the cyclic prefix is added and transmitting the analog-transformed signal.

To achieve the first object, the present invention provides an apparatus for receiving OFDM signals, the apparatus including: an analog-to-digital converter for obtaining signal samples by digital-converting received OFDM signals; a cyclic prefix remover for finding the starting point of an N-sized signal sample block from the signal samples, and removing a cyclic prefix; a signal receiving deinterleaver for dividing the signal sample block into L M-sized small blocks, where N, M and L are integers of 1 or more, and L=N/M; L M-point fast Fourier transformers for M-point fast Fourier transforming the L small blocks; a signal receiving interleaver for interleaving the L M-point fast Fourier transformed small blocks, thereby generating an N-sized transform block; a detector for detecting data from the N-sized transform block; and a decoder for decoding the detected data.

To achieve the second object, the present invention provides an apparatus for transmitting OFDM signals, the apparatus including: a pre-processor for encoding an input data sequence and converting the encoded data to parallel data; a block signal domain transformer for dividing the encoded data into blocks of predetermined sizes, inserting "0" at the first data position of each block, transforming each block into a time domain signal, and combining time domain signals; a pilot signal adder for converting pilot tones, which are to be inserted at positions other than a predetermined position among the positions at which "0" has been inserted in the block signal domain transformer, into time domain pilot signals, and adding the pilot signals to the time domain signals output by the block signal domain transformer; and a post-processor for converting the resultant signals of the pilot signal adder to serial signals, adding a cyclic prefix to each of the converted signals, converting the resultant signals to analog signals, and transmitting the analog signals.

To achieve the second object, the present invention provides an apparatus for receiving OFDM signals, the apparatus including: a pre-processor for converting a received OFDM signal to a digital signal, removing a cyclic prefix from the digital signal, converting the resultant signal to parallel signals of predetermined sizes, and transforming each of the parallel signals to a frequency domain signal; a channel estimator for inserting virtual pilot tones at predetermined positions of the frequency domain signal, extracting the virtual pilot tones and pilot tones added upon transmission, and estimating channel characteristics from the extracted virtual pilot tones and pilot tones; an equalizer for compensating for distortion of the output signal of the pre-processor caused by a channel, according to the estimated channel characteristics; an intermediate processor for converting the output signal of the equalizer to a time domain signal and removing pilot signals from the time domain signal; a signal domain transformer for transforming the output signal of the intermediate processor to a frequency domain signal; and a post-processor for detecting transmission data from the frequency domain signal, converting the detected data to serial data, and decoding the serial data.

To achieve the second object, the present invention provides a method for transmitting OFDM signals, the method including: (a) encoding an input data sequence, and converting encoded data to parallel data; (b) dividing the encoded data into blocks of predetermined sizes and inserting "0" at the first position of each block; (c) transforming each block to which "0" is inserted, to a time domain signal, and combining the time domain signals; (d) transforming pilot tones, which are to be inserted at positions other than a predetermined position among the positions at which "0" has been inserted, into time domain pilot signals, and adding each of the pilot signals to the time domain signal of each block; and (e) converting the resultant signal of the step (d) to a serial signal, adding a cyclic prefix to the converted signal, converting the resultant signal to an analog signal, and transmitting the analog signal.

To achieve the second object, the present invention provides a method of transmitting OFDM signals, the method including: (a) converting a received signal into a digital signal, removing a cyclic prefix from the digital signal, converting the resultant signal into parallel signals of predetermined sizes, and converting each parallel signal to a frequency domain signal; (b) inserting a virtual pilot tone at predetermined positions of the frequency domain signal and extracting the virtual pilot tone and pilot tones added upon transmission; (c) estimating channel characteristics from the extracted virtual pilot tone and pilot tones; (d) compensating for distortion caused by a channel with respect to the frequency domain signal, according to the estimated channel characteristics; (e) transforming a distortion-compensated signal into a time domain signal and removing pilot signals from the time domain signal; and (f) detecting transmission data by transforming the resultant signals of the step (e) to a frequency domain signal, and converting the detected transmission data to serial data and decoding the serial data.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
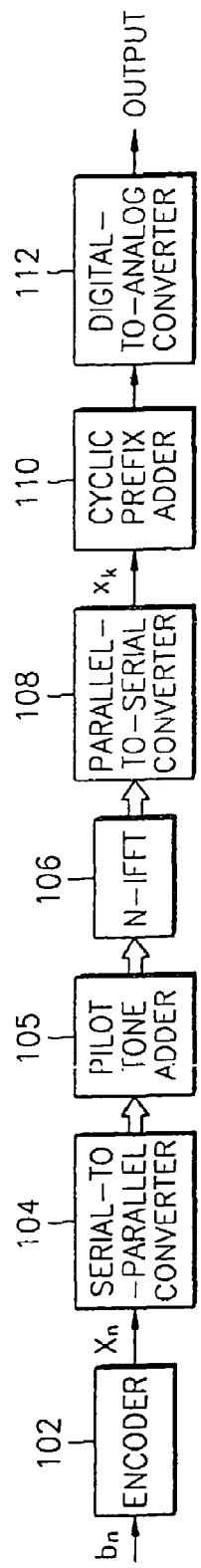
FIG. 1 is a block diagram of the structure of a conventional OFDM signal transmitting apparatus.
Figure 2:
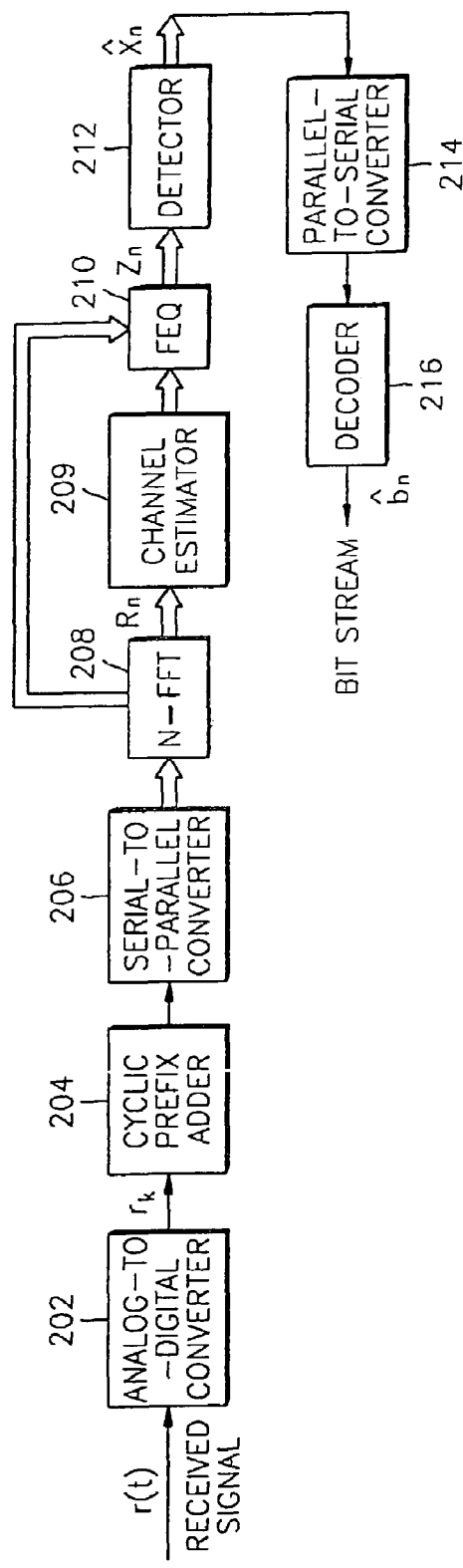
FIG. 2 is a block diagram of the structure of a conventional OFDM signal receiving apparatus.
Figure 3:
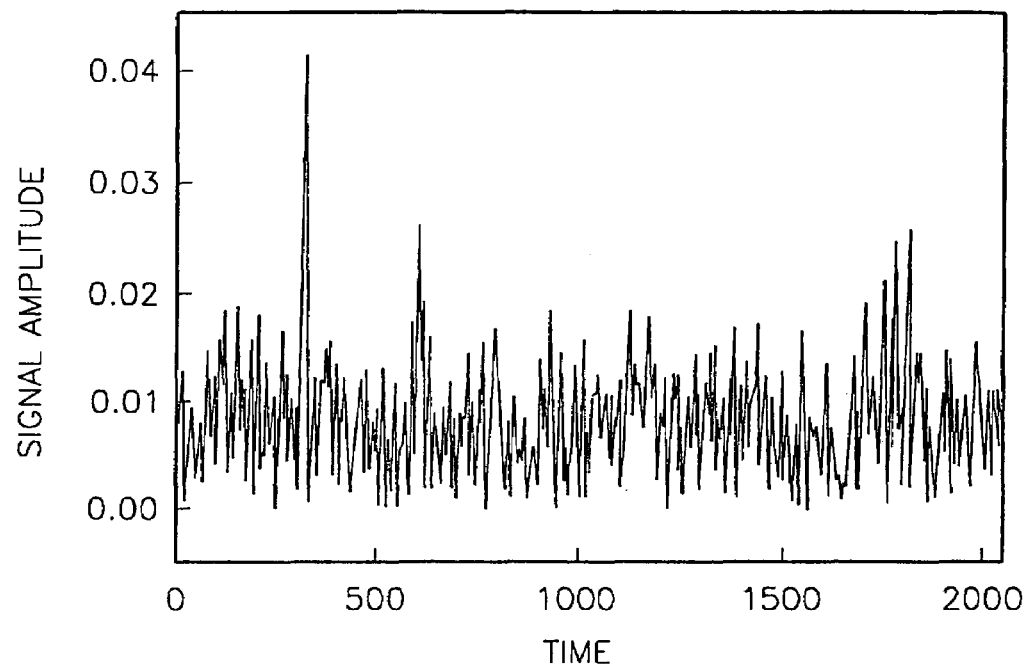
FIG. 3 is a graph showing the amplitude of an OFDM signal.
Figure 4:
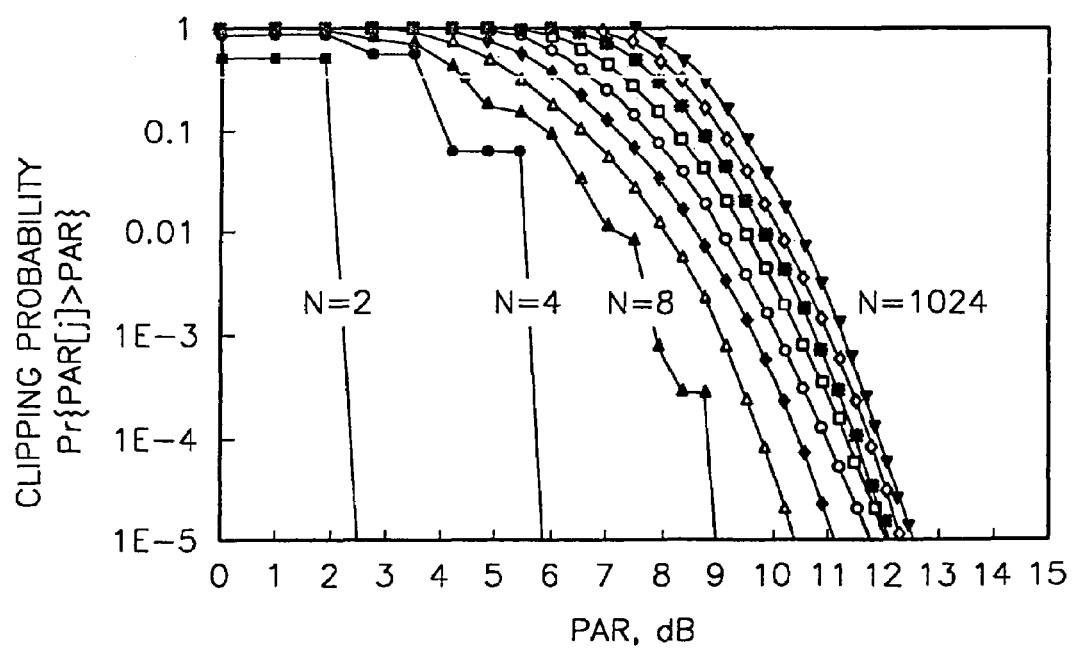
FIG. 4 is a graph of PAR distribution of OFDM symbols when an N value is 2, 4, 8, 16, . . . , 1024.
Figure 5:
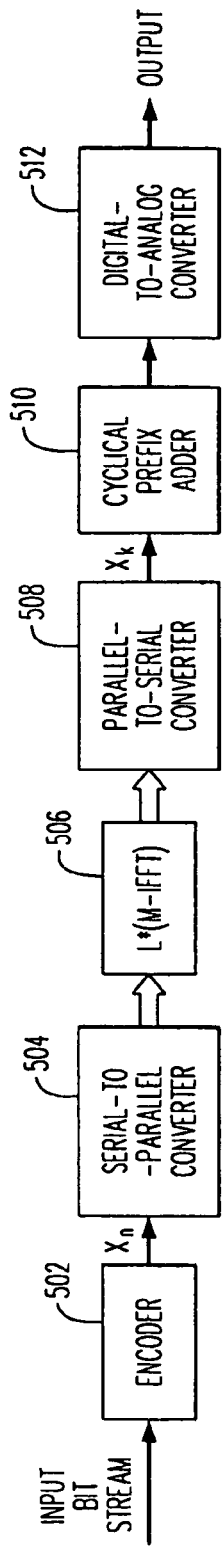
FIG. 5 is a block diagram of the structure of an OFDM signal transmitting apparatus according to an embodiment of the present invention.

Referring to FIG. 5, a signal transmitting apparatus according to an embodiment of the present invention includes an encoder 502, a serial-to-parallel converter 504, an L-distribution M-point inverse fast Fourier transformer (L*(M-IFFT)) 506, a parallel-to-serial converter 508, a cyclic prefix adder 510 and a digital-to-analog converter 512. The structure of the signal transmitting apparatus of FIG. 5 is similar to that of the conventional signal transmitting apparatus of FIG. 1. That is, the L*(M-IFFT) 506 instead of the N-IFFT 106 of the conventional signal transmitter is used, and the encoder 502, the serial-to-parallel converter 504, the parallel-to-serial converter 508, the cyclic prefix adder 510 and the digital-to-analog converter 512 according to the present invention correspond to the encoder 102, the serial-to-parallel converter 104, the parallel-to-serial converter 108, the cyclic prefix adder 110 and the digital-to-analog converter 112, respectively.

Figure 6:
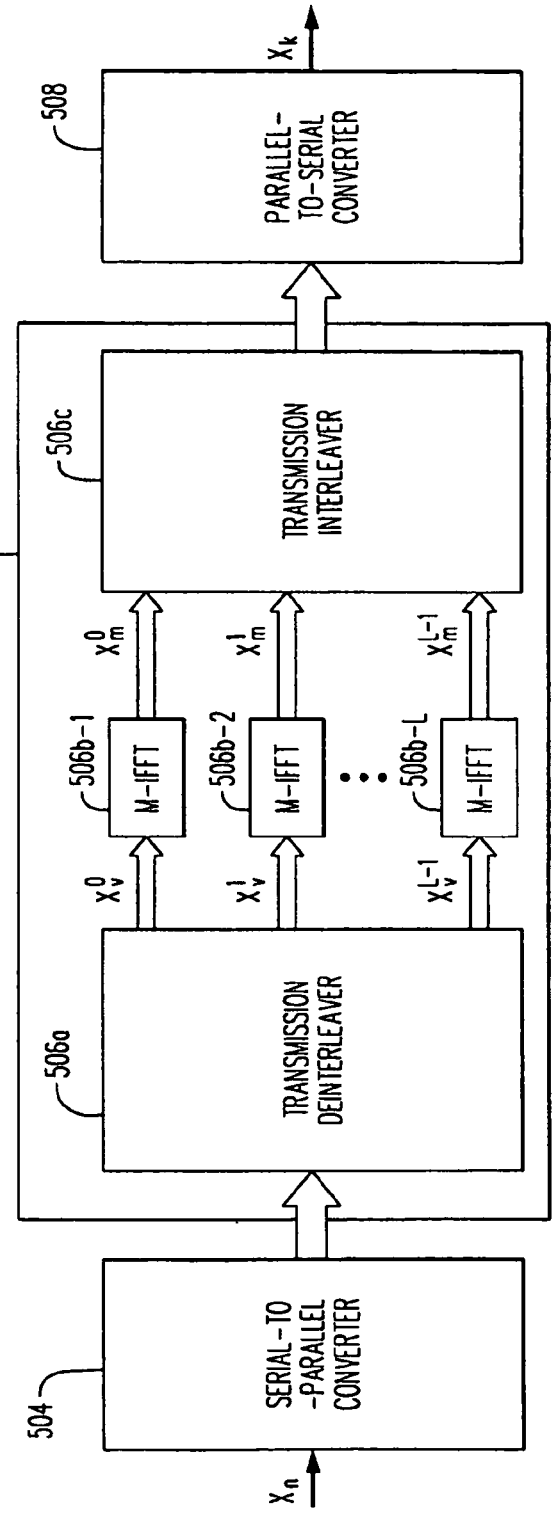
FIG. 6 is a block diagram of the structure of an embodiment of the L*(M-IFFT) of FIG. 5.

FIG. 6 shows an embodiment of the L*(M-IFFT) 506 of FIG. 5. The transmission deinterleaver 506a divides an N-sized input signal block into L M-sized small blocks. Then, each of the small blocks is M-point inverse fast Fourier transformed by L M-IFFTs 506b-1, 506b-2, . . . , 506b-L. Here, M×L=N. Then, the transmission interleaver 506c interleaves the outputs of the L M-IFFTs and then forms an N-sized block.

Figure 7:
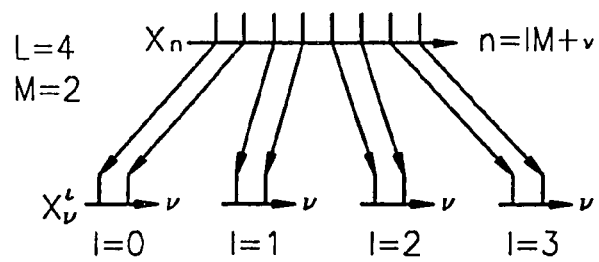
FIG. 7 shows an embodiment of the transmission deinterleaver of FIG. 6.
Figure 8:
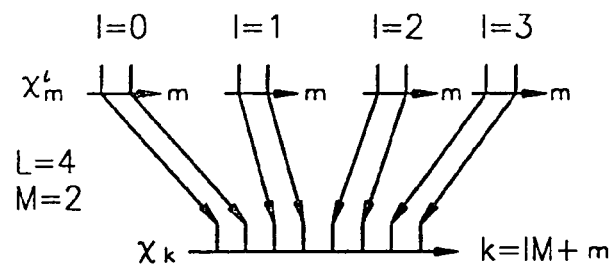
FIG. 8 shows a first embodiment of the transmission interleaver of FIG. 6.
Figure 9:
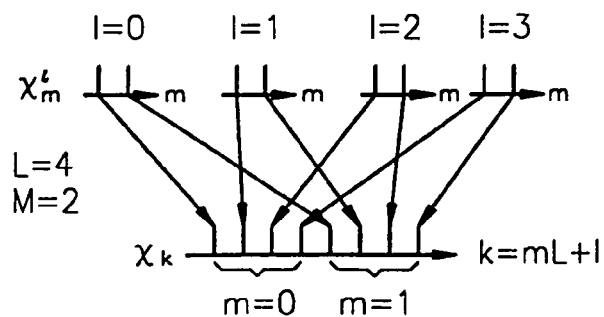
FIG. 9 shows a second embodiment of the transmission interleaver of FIG. 6.

FIG. 7 shows an embodiment of the transmission deinterleaver 506a when N= 8, M=2, and L=4. FIGS. 8 and 9 show first and second embodiments of the transmission interleaver 506c when N=8, M=2 and L=4.

L small blocks $X_v^l$, l=0,1, . . . ,L−1 are composed of an input vector $X_n$.

$$X_v^l = X_{lM+v} = X_n,\ n = lM+v,\ l=0,1,\ldots,L-1,\ v=0,1,\ldots,M-1 \tag{10}$$

L M-IFFTs (506b-1, 506b-2, . . . , 506b-L) receive $X_v^l$, l=0,1, . . . ,L−1 and perform M-point inverse fast Fourier transforms as shown in Equation 11 to output $x_m^l$, l=0,1, . . . ,L−1.

$$x_m^l = \frac{1}{M}\sum_{m=0}^{M-1} X_v^l e^{j2\pi mnu/M},\ l=0,1,\ldots,L-1,\ m=0,1,\ldots,M-1 \tag{11}$$

In the transmission interleaver 506c, outputs $x_m^l$, l=0,1, . . . ,L−1 of L M-IFFTs (506b-1, 506b-2, . . . , 506b-L) are combined into a block to output $x_k$, k=0,1, . . . ,N−1. Equation 12 indicates the first embodiment of FIG. 8, and Equation 13 indicates the second embodiment of FIG. 9.

$$x_k = x_{lM+m} = x_m^l,\ k=lM+m,\ l=0,1,\ldots,L-1,\ m=0,1,\ldots,M-1 \tag{12}$$

$$x_k = x_{mL+l} = x_m^l,\ k=mL+l,\ l=0,1,\ldots,L-1, m=0,1,\ldots,M-1 \tag{13}$$

According to the signal transmitting apparatus of the present invention, the last G samples of N time domain signal samples $x_k$, k=0,1, . . . ,N−1 are copied, the copied samples are attached as a cyclic prefix to the front of the N samples to make a time domain OFDM symbol block, and then the samples are converted to analog signals to be transmitted.

Figure 10:
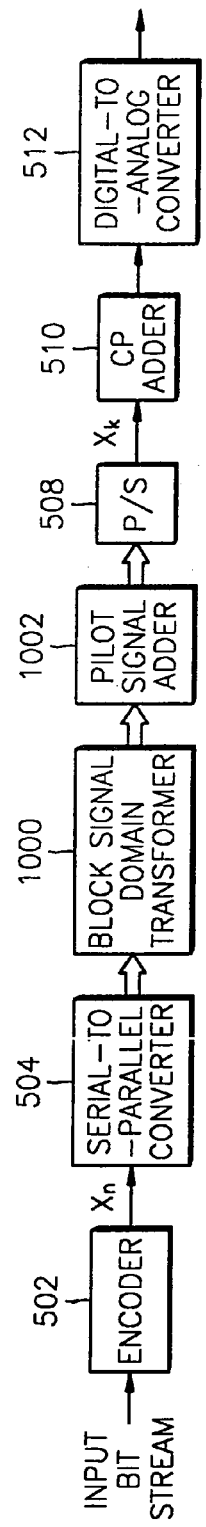
FIG. 10 is a block diagram of the structure of an OFDM signal transmitting apparatus according to another embodiment of the present invention.

FIG. 10 is a block diagram of the structure of an OFDM signal transmitting apparatus according to another embodiment of the present invention. Referring to FIG. 10, the OFDM signal transmitting apparatus includes an encoder 502, a serial-to-parallel converter 504, a block signal domain transformer 1000, a pilot signal adder 1002, a parallel-to-serial converter 508, a cyclic prefix (CP) adder 510 and a digital-to-analog converter 512.

The operations of the encoder 502, the serial-to-parallel converter 504, the parallel-to-serial converter 508, the CP adder 510, and the digital-to-analog converter 512 are the same as those of FIG. 5.

Figure 11:
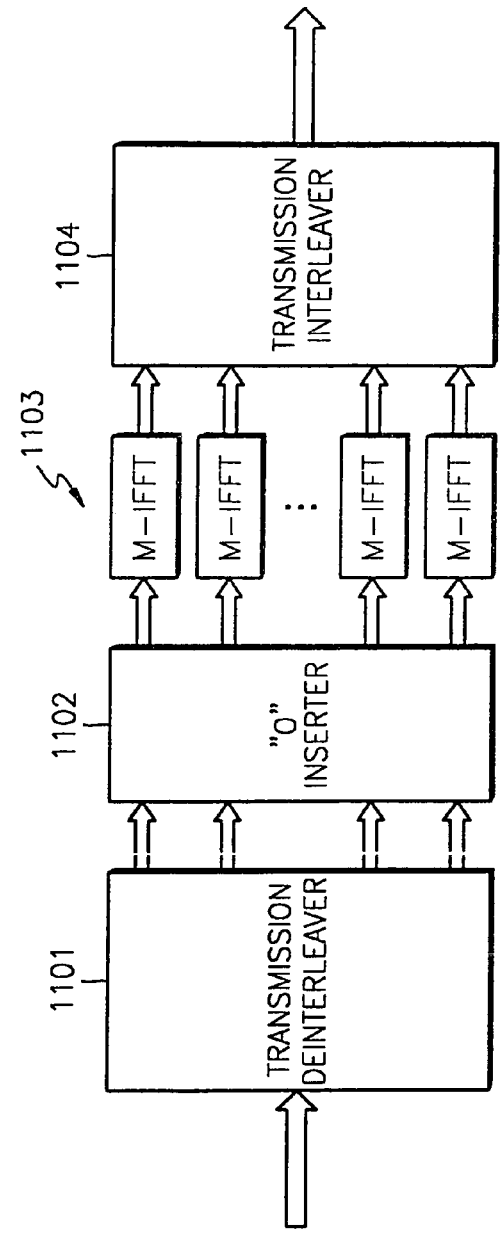
FIG. 11 is a detailed block diagram of the block signal domain transformer of FIG. 10.

The block signal domain transformer 1000 includes a transmission deinterleaver 1101, a "0" inserter 1102, L M-IFFTs 1103 and a transmission interleaver 1104, as shown in FIG. 11.

The transmission deinterleaver 1101 in the block signal region converter 1000 divides an N-sized vector or block into L M-sized vectors or blocks. That is, ML is equal to N. In this way, L blocks are formed. L blocks $X_v^l$, l=0,1, . . . ,L−1, v=0,1, . . . ,M−1 are obtained by Equation 10.

Figure 12:
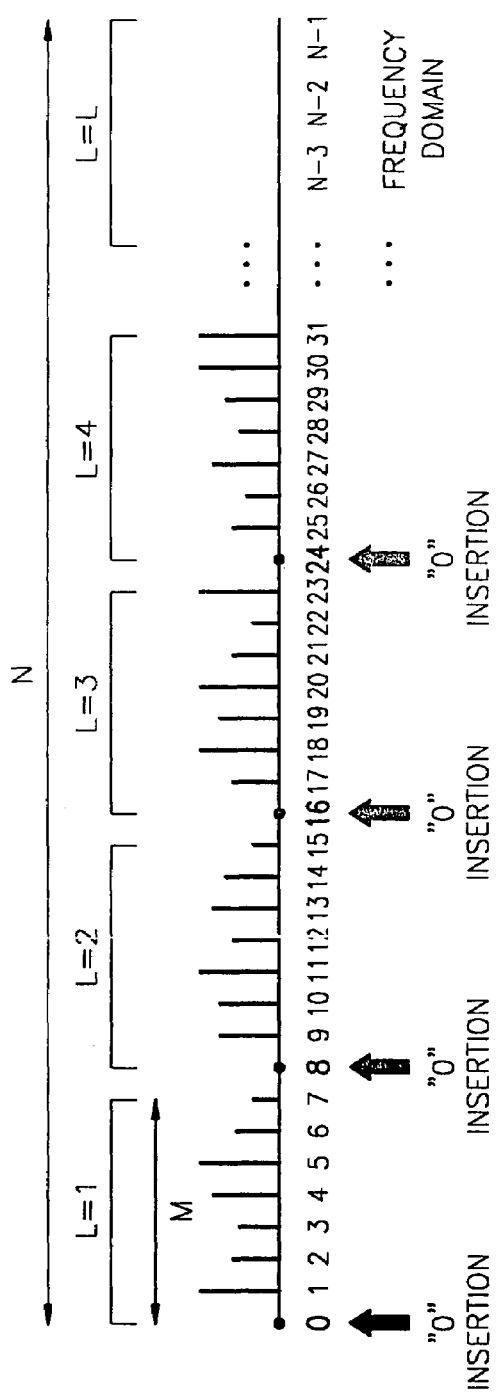
FIG. 12 shows the results of the operation of the "0" inserter of FIG. 11.

The "0" inserter 1102 inserts "0" into the first data in each block to avoid DC offset. FIG. 12 shows blocks each of which has "0" inserted at the first position. The L M-IFFTs 1103 perform M-point IFFTs on the input $X_v^l$, l=0,1, . . . ,L−1, v=0,1, . . . ,M−1 in each block as in Equation 11 to output $X_m^l$, l=0,1, . . . ,L−1, m=0,1, . . . ,M−1.

The transmission interleaver 1104 combines the outputs $X_m^l$, l=0,1, . . . ,L−1, m=0,1, . . . ,M−1 of the L M-IFFTs 1103 into a single block to output $x_k$, k=0,1, . . . ,N−1. The output of the transmission interleaver 1104 can be expressed as in Equations 12 and 13, depending on the combining method of the transmission deinterleaver 1101.

Figure 13:
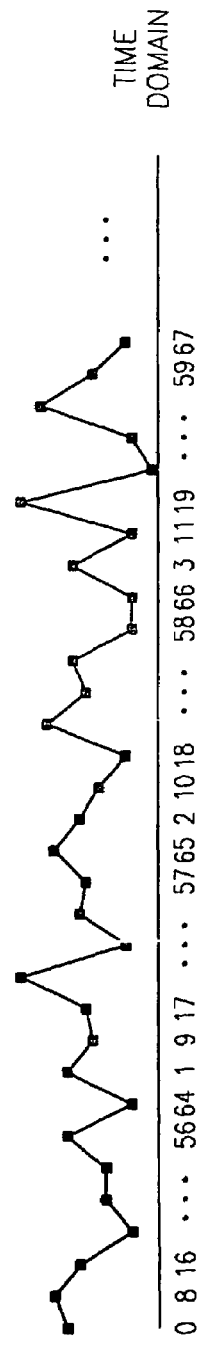
FIG. 13 shows the results of the operation of the transmission interleaver of FIG. 11.
Figure 14:
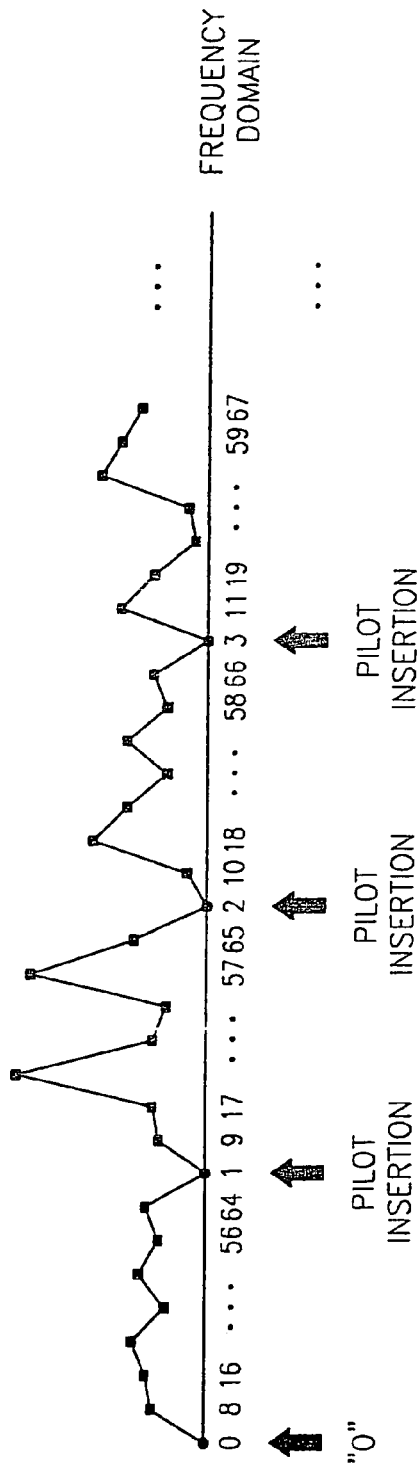
FIG. 14 shows a result of the insertion of pilot signals of the time domain in view of the frequency domain.

FIG. 13 shows an example of the sum of M-IFFTed signals. The pilot signal adder 1002 converts pre-designated pilot tones to time domain pilot signals and adds the time domain pilot signals at all positions except a position where M=1 and L=1, among positions of the M-IFFTed signals to which "0" is inserted in the block signal domain transformer 1000. FIG. 14 shows an example of the insertion of pilot signals of the time domain in view of the frequency domain.

Figure 15:
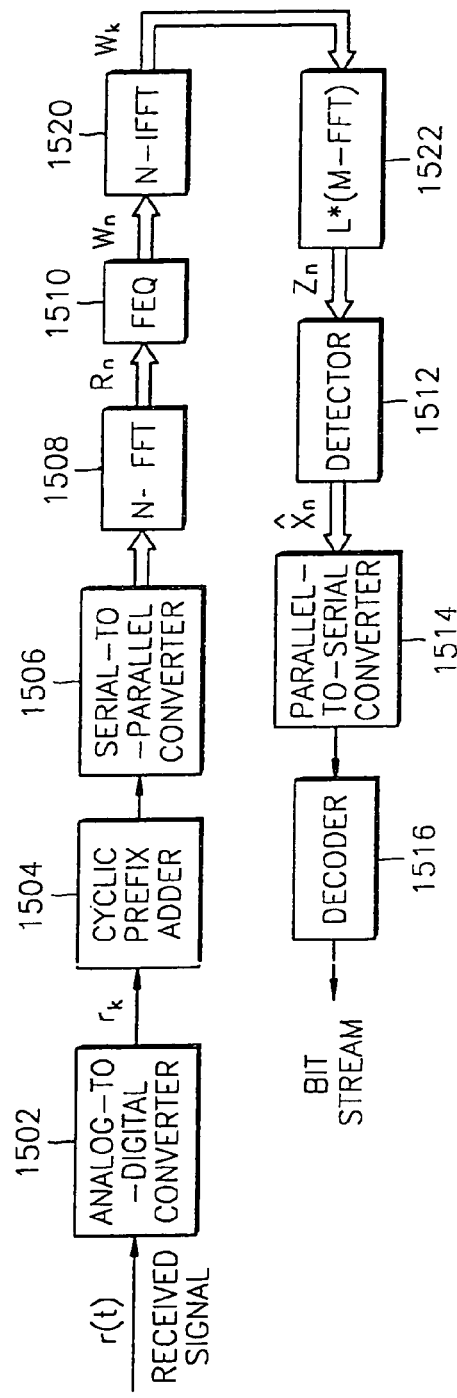
FIG. 15 is a block diagram of the structure of an OFDM signal receiving apparatus according to an embodiment of the present invention.

FIG. 15 shows an embodiment of the signal receiving apparatus according to the present invention, which corresponds to the transmitting apparatus of FIG. 5. The received analog signal r(t) is sampled by an analog-to-digital converter 1502 to be converted to a digital signal $r_k$. A cyclic prefix remover 1504 finds the starting point of each of the OFDM symbol blocks of the received signal, removes the cyclic prefix, and outputs the N signal samples. A serial-to-parallel converter 1506 converts a series of signal samples to an N-sized vector to output the converted vector to an N-FFT 1508. The N-FFT 1508 transforms a time domain signal $r_k$ to a frequency domain signal $R_n$. A FEQ 1510 multiplies the output $R_n$ of the N-FFT 1508 by its tap coefficients for each frequency index n to thereby compensate for signal distortion caused by the channel, and outputs $W_n$. The N-IFFT 1520 N-point inverse fast Fourier transforms an input signal $W_n$ to a time domain signal $w_k$. Here, a series of processes by the N-FFT 1508, the FEQ 1510 and the N-IFFT 1520 is an example of means for correcting distortion caused by a channel in a received signal $r_k$ and obtaining a signal $w_k$, which may be realized by another filtering process.

Figure 16:
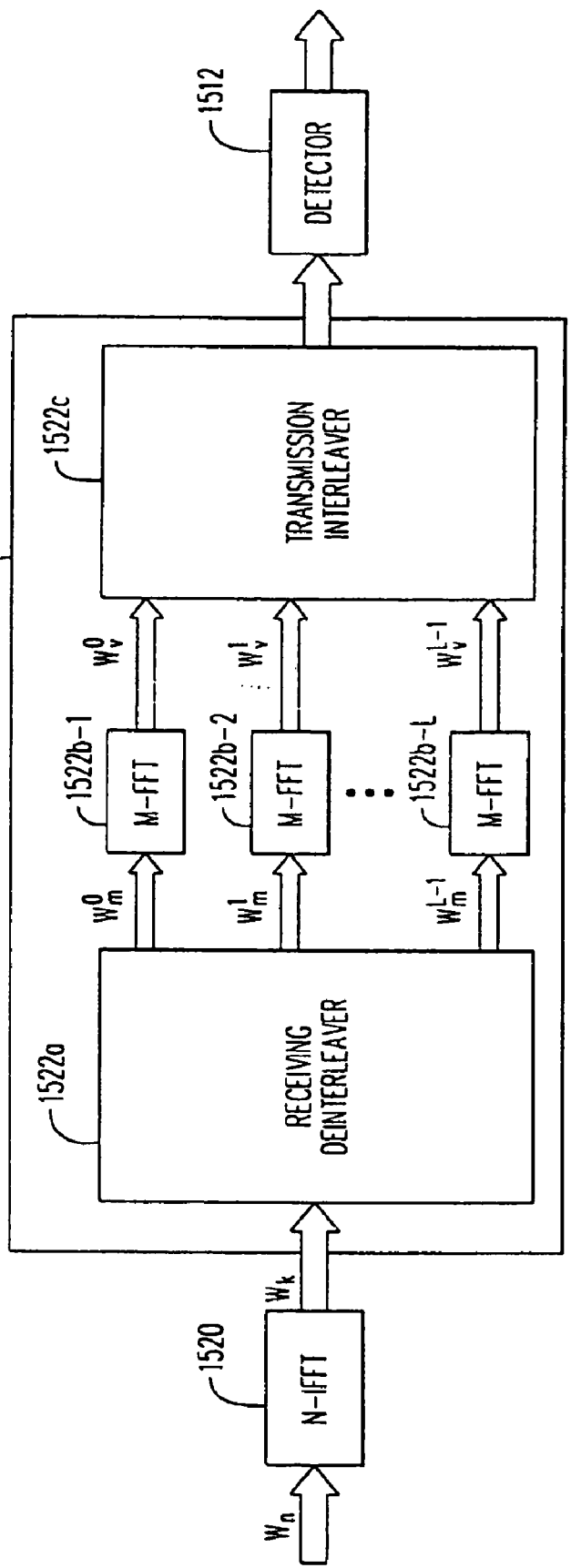
FIG. 16 is a block diagram of the structure of an embodiment of the L*(M-FFT) of FIG. 15.
Figure 17:
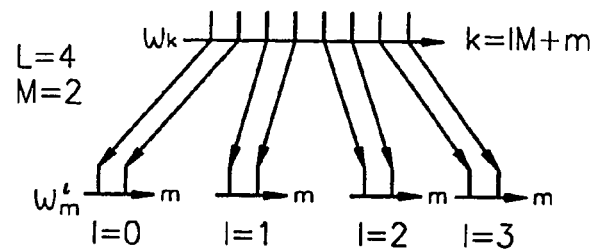
FIG. 17 shows a first embodiment of the receiving deinterleaver of FIG. 15.
Figure 18:
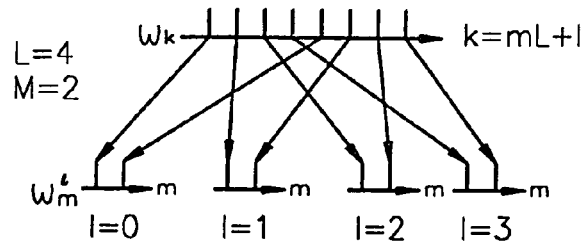
FIG. 18 shows a second embodiment of the receiving deinterleaver of FIG. 15.
Figure 19:
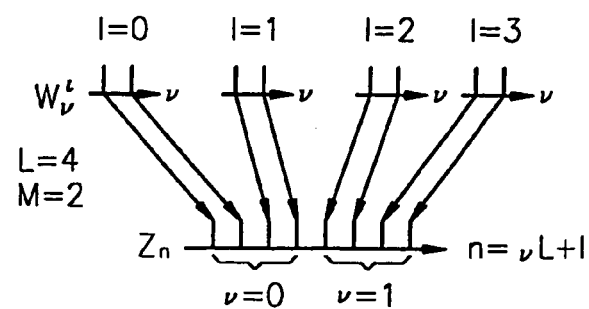
FIG. 19 shows an embodiment of the receiving interleaver of FIG. 15.

FIG. 16 shows an embodiment of an L-division M-point fast Fourier transformer (L*(M-FFT)) 1522 of FIG. 15. In operation, a receiving deinterleaver 1522a divides an N-sized input signal block into L M-sized small blocks. Then, each of small blocks is M-point fast Fourier transformed through the L M-FFTs (1522b-1, 1522b-2, . . . , 1522b-L), where M×L=N. Then, a receiving interleaver 1522c composes an N-sized block by interleaving the outputs of the L M-FFTs (1522b-1, 1522b-2, . . . , 1522b-L). FIGS. 17 and 18 show first and second embodiments of the receiving deinterleaver 1522a when N=8, M=2 and L=4. FIG. 19 shows an embodiment of the receiving interleaver 1522c when N=8, M=2 and L=4. FIG. 17 shows the operation of the receiving deinterleaver 1522a of a signal receiving apparatus corresponding to the case in which a transmission interleaver 506c of a signal transmitting apparatus is implemented to operate as shown in FIG. 8. FIG. 18 shows the operation of the receiving deinterleaver 1522a of the signal receiving apparatus corresponding to the case in which a transmission interleaver 506c of a signal transmitting apparatus is implemented to operate as shown in FIG. 19. Equation 14 shows an embodiment of the operation of the receiving deinterleaver 1522a of FIG. 12, and Equation 15 shows an embodiment of the operation of the receiving deinterleaver 1522a of FIG. 13.

The L M-FFTs (1522b-1, 1522b-2, . . . , 1522b-L) receive $\omega_m^l$, l=0,1, . . . ,L-1 and perform the M-point fast Fourier transform of Equation 16, to thereby output $W_v^l$, l=0,1, . . . ,L-1.

$$W_v^l = \sum_{m=0}^{M-1} \omega_m^l e^{j2\pi mv/M}, l = 0, 1, \ldots, L-1, v = 0, 1, \ldots, M-1 \quad (16)$$

Then, the receiving interleaver 1522c interleaves the output $W_v^l$, l=0,1, . . . ,L-1 of the L M-FFTs (1522b-1, 1522b-2, . . . , 1522b-L) to form an N-sized block $Z_n$, as in Equation 17:

$$Z_n = Z_{lM+v} = W_v^l, \; n=lM+v, \; l=0,1, \ldots ,L-1, \; v=0,1, \ldots ,M-1 \quad (17)$$

A detector 1512 detects $X_n$ from $Z_n$.

Figure 20:
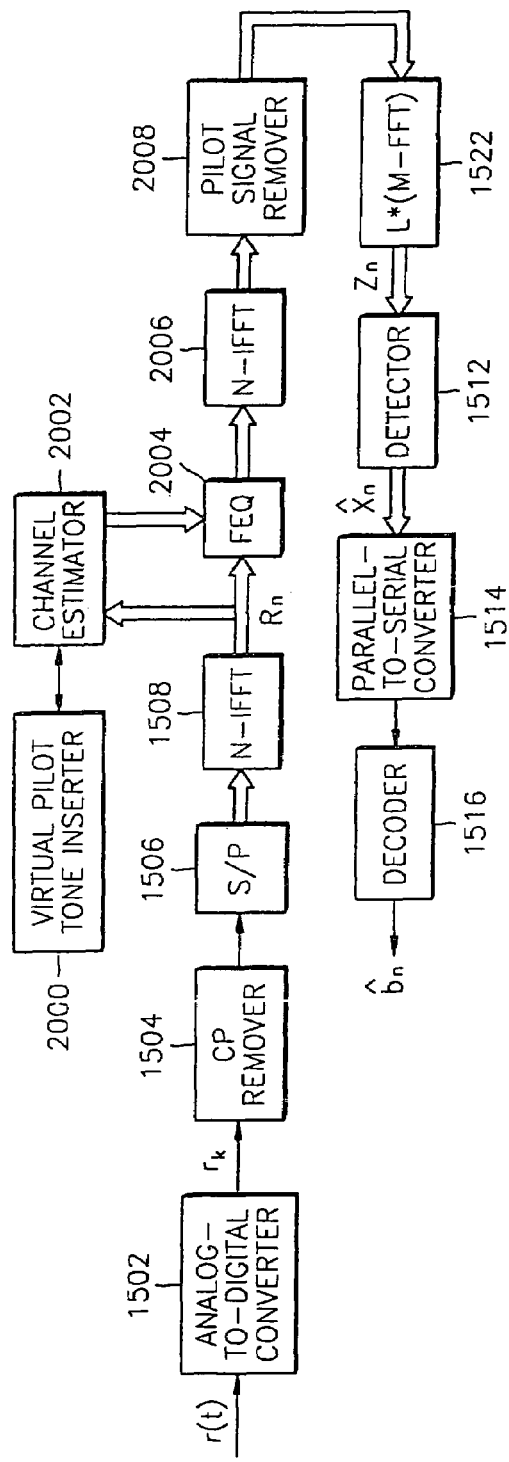
FIG. 20 is a block diagram of a receiving apparatus that corresponds to the OFDM signal transmitting apparatus shown in FIG. 10.

FIG. 20 is a block diagram of a receiving apparatus that corresponds to the OFDM signal transmitting apparatus shown in FIG. 10. Referring to FIG. 20, the OFDM signal receiving apparatus includes an analog-to-digital converter 1502, a CP remover 1504, a serial-to-parallel converter 1506, an N-FFT 1508, a virtual pilot signal inserter 2000, a channel estimator 2002, an FEQ 2004, an N-IFFT 2006, a pilot signal remover 2008, an L*(M-FFT) 1522, a detector 1512, a parallel-to-serial converter 1514, and a decoder 1516.

Figure 21:
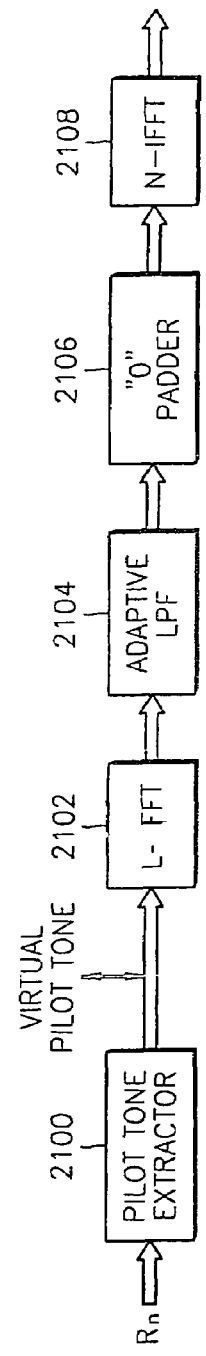
FIG. 21 is a block diagram showing the channel estimator of FIG. 20 in greater detail.

The channel estimator 2002 includes a pilot signal extractor 2100, an L-FFT 2102, an adaptive low pass filter (LPF) 2104, a "0" padder 2106 and an N IFFT 2108, as shown in FIG. 21.

The analog-to-digital converter 1502, the CP remover 1504, the serial-to-parallel converter 1506, the N-FFT 1508, the L*(M-FFT) 1522, the detector 1512, the parallel-to-serial converter 1514, and the decoder 1516 operate the same as their counterparts, of FIG. 15.

The virtual pilot tone inserter 2000 generates a virtual pilot tone and insert the same into a position where M=1 and L=1 in the output signal of the N-FFT 1508. The virtual pilot tone $P_{M=1,L=1}$ is obtained by calculating the average of a pilot tone at the position where M=1 and L=2 and that at the position where M=1 and L=L, among the pilot tones extracted by the channel estimator 2002 as in Equation 18:

$$P_{M=1,L=1} = \frac{(P_{M=1,L=2} + P_{M=1,L=L})}{2} \quad (18)$$

Figure 22:
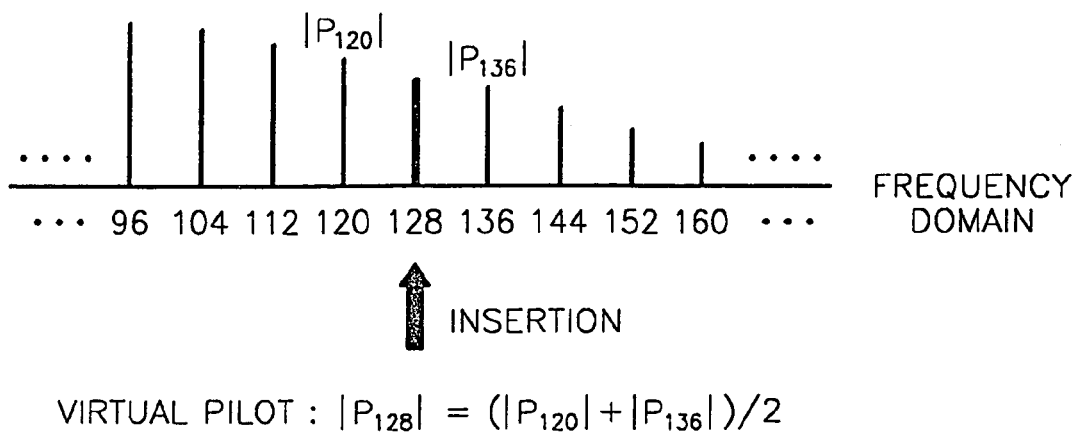
FIG. 22 shows a result of the insertion of a virtual pilot tone in the frequency domain.
Figure 23A:
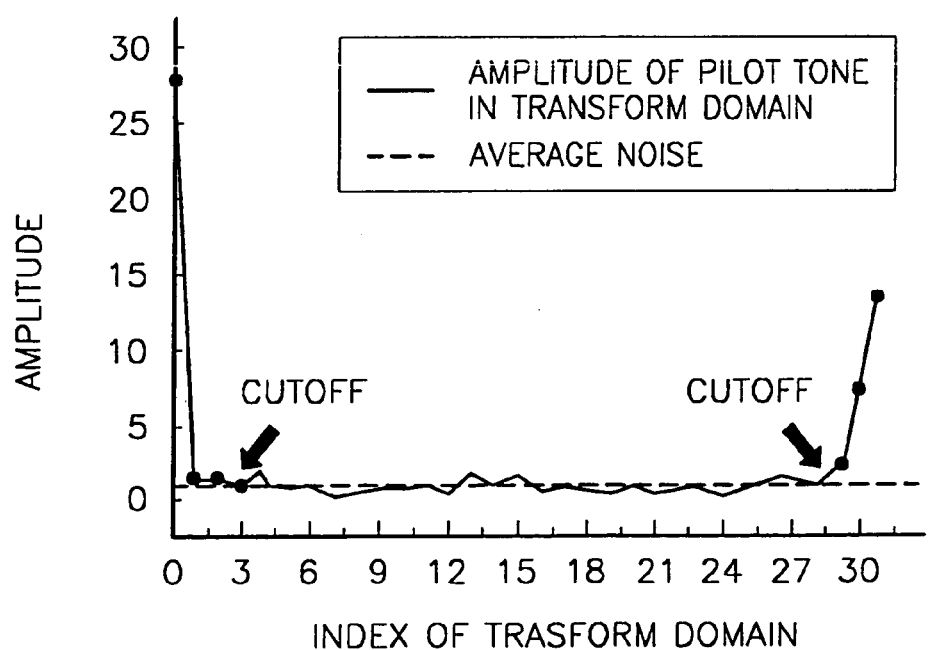
FIG. 23A is a graph showing the amplitude of a pilot tone in the transform domain.

FIG. 22 illustrates the insertion of a virtual pilot tone in the frequency domain. The channel estimator 2002 estimates a channel from a signal into which the virtual pilot tone is inserted. The operation of the channel estimator 2002 will now be described in more detail with reference to FIG. 21. The pilot signal extractor 2100 extracts pilot tones from the output signal $R_n$ of the N-FFT 1508, and normalizes the values of the extracted pilot tones together with the virtual pilot tone. The L-FFT 2102 transforms the extracted pilot tones from the frequency domain to the transform domain by performing L-point FFT on the extracted pilot tones. The adaptive LPF 2104 cuts off pilot tones whose amplitudes are smaller than a mean noise level, among the pilot tones in the transform domain, depending on designed filter coefficients. FIG. 23A shows the amplitudes of pilot tones in the transform domain. As shown in FIG. 23A, pilot tones whose amplitudes are smaller than the mean noise level are cut off.

Figure 23B:
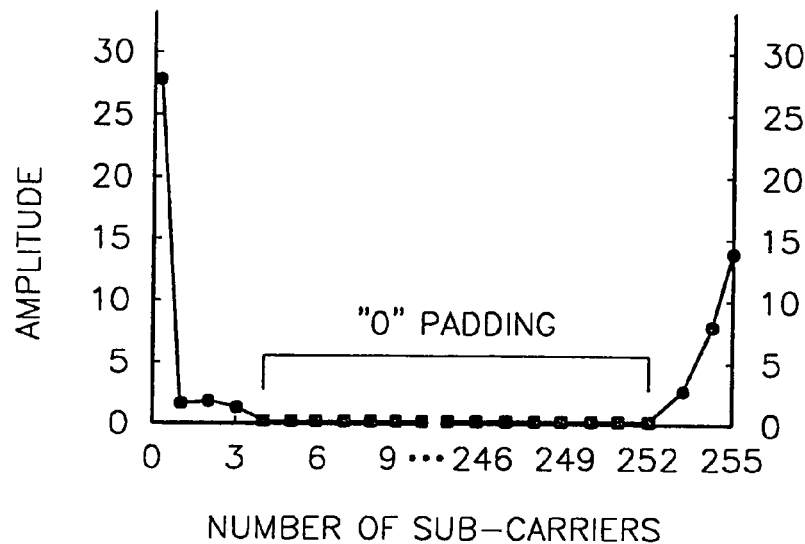
FIG. 23B is a graph showing cutoff signal components to which "0" is added in the transform domain.

The "0" padder 2106 adds "0"s to the signal components cut off by the adaptive LPF 2104. FIG. 23B shows an example of the cutoff signal components to which "0"s are added in the transform domain.

The N-IFFT 2108 transforms the output of the "0" padder 2106 to a signal of the frequency domain to obtain an estimated channel response.

The FEQ 2004 compensates for signal distortion, caused by a channel, in the output $R_n$ of the N-FFT 1508, by using the estimated channel response value as its tap coefficients.

The N-IFFT 2006 N-point inverse fast Fourier transforms the output signal of the FEQ 2004 to a time domain signal $W_k$. The pilot signal remover 2008 removes the pilot signal added upon transmission.

Figure 24A:
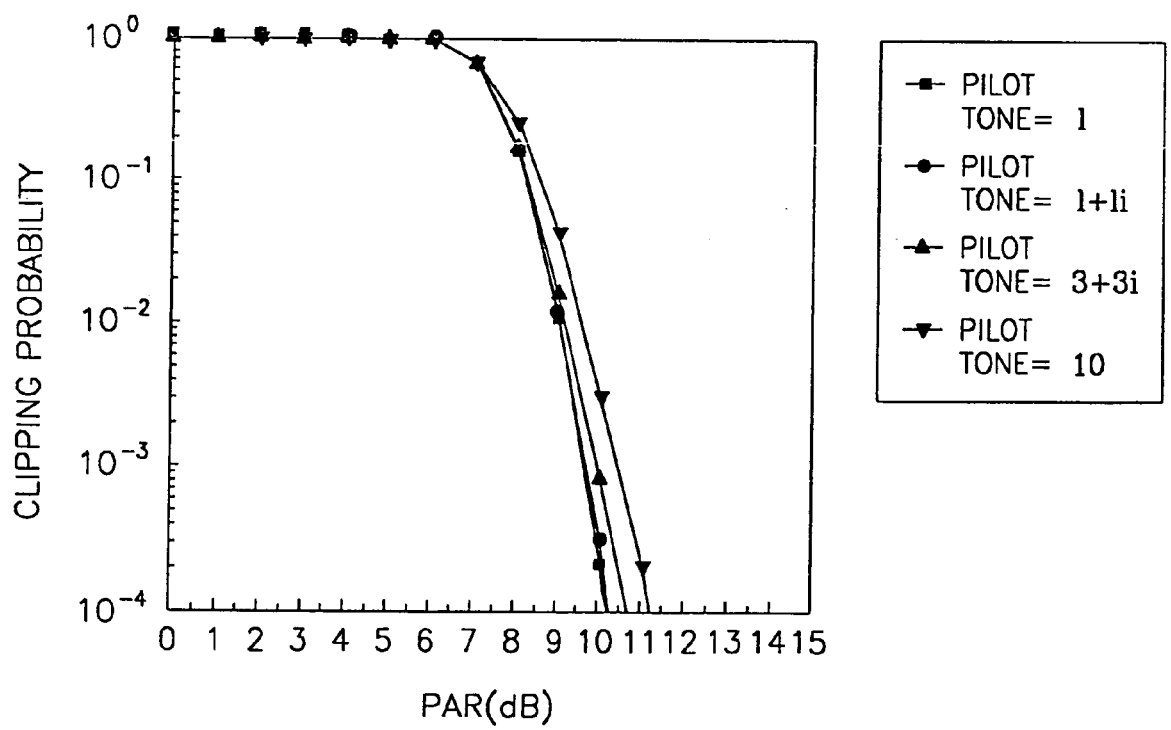
FIG. 24A is a graph showing the clipping probability with respect to a peak-to-average power ratio (PAR) in the OFDM signal transmitting/receiving apparatus shown in FIGS. 10 and 20.

FIG. 24A shows the clipping probability with respect to a PAR in the OFDM signal transmitting/receiving apparatus shown in FIGS. 10 and 20.

Figure 24B:
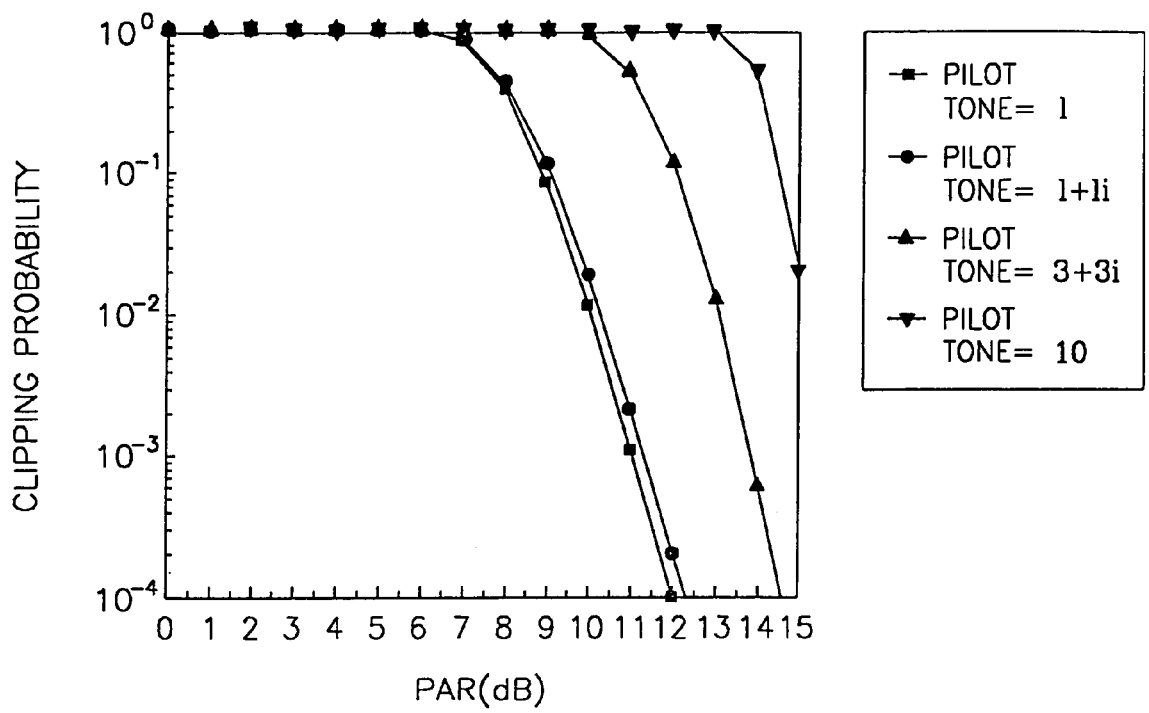
FIG. 24B is a graph showing the clipping probability with respect to a PAR according to the prior art.

FIG. 24B shows the clipping probability with respect to a PAR according to the prior art. That is, FIG. 24B shows the clipping probability with respect to a PAR in the case where pilot tones are added in the frequency domain where N-IFFT has not been performed yet.

In each of FIGS. 24A and 24B, four different cases of a pilot tone of 1, a pilot tone of 1+1i, a pilot tone of 3+3i, and a pilot tone of 10 are applied for comparison. It can be seen from FIGS. 24A and 24B that the PAR of embodiments of the present invention increases very little even though the amplitudes of pilot tones are changed, while the PAR in the prior art significantly increases as the amplitudes of pilot tones vary.

Figure 25:
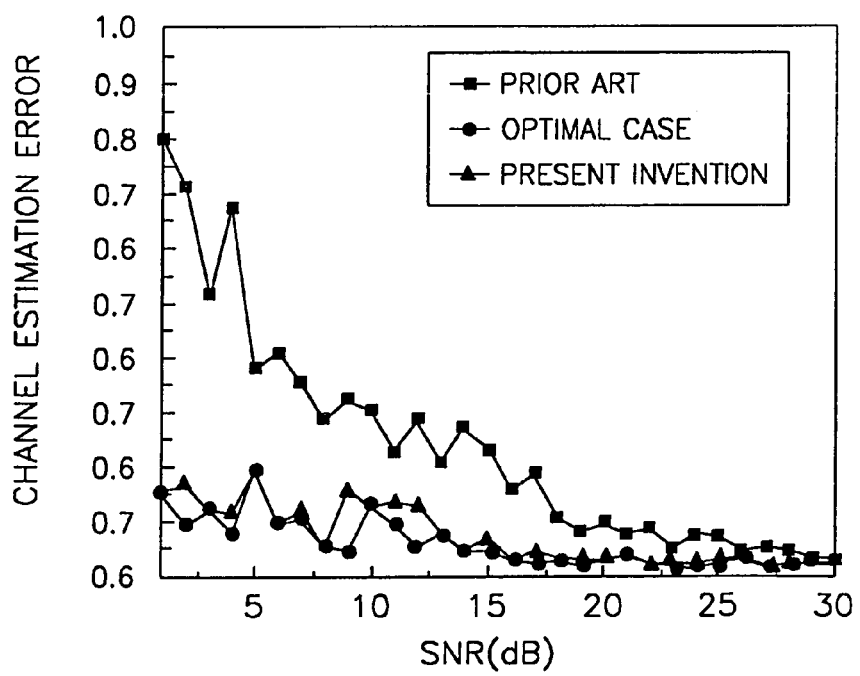
FIG. 25 is a graph showing channel estimation error according to the present invention, in the prior art, and in the optimal case, with respect to a signal-to-noise ratio (SNR) in a channel having severe fading.

FIG. 25 is a graph showing channel estimation error of various embodiments according to the present invention shown in FIGS. 10 and 20, channel estimation error of various embodiments in the prior art, and channel estimation error in the optimal case, with respect to signal-to-noise ratios (SNR) in a channel where severe fading occurs. Here, the prior art is based on linear interpolation.

As shown in FIG. 25, various embodiments of the present invention can significantly reduce the level of channel estimation error compared to the prior art, and achieves channel estimation error that is similar to that in the optimal case. A simulation made under the channel conditions of severe fading showed that various embodiments of the present invention achieves a bit error ratio (BER) which is only 0.5 to 1 dB less than that of the optimal case.

According to the present invention, when L=N and M=1, the input of L*(M-IFFT) 506 of FIG. 5 is the same as the output thereof so that signals in time domain are generated. Here, a serial-to-parallel converter 504 and a parallel-to-serial converter 508 of a signal transmitting apparatus are not required. Also, the input of L*(M-FFT) 1522 of FIG. 15 is the same as the output thereof. According to the method of transmitting signals in accordance with the present invention, signals in time domain are generated and the generated signals are transmitted and data in the time domain is detected, which is the same as the conventional method for transmitting single carrier signals. However, according to a signal transmitting method in accordance with of the present invention, the signal transmitting apparatus adds a cyclic prefix to every N-sized block and the signal receiving apparatus removes the cyclic prefix from the received signal, and data is detected by processing of a N-FFT 1508, a FEQ 1510 and a N-IFFT 1520, which is different to the conventional method for transmitting single carrier signals. According to various embodiments of the present invention, an equalizer of the signal receiving apparatus operates in a frequency domain to thereby solve the problems generated when code processed by the equalizer is lengthened by the conventional single carrier signal transmitting method.

According to various embodiments of the present invention, signals in the time domain are generated by L*(M-IFFT) 506 so that the maximum PAR value of the signal is as follows.

$$\xi = \sqrt{N}\xi_x = \sqrt{N/L}\tilde{\xi}_x \tag{19}$$

That is, compared to the conventional OFDM signal, the maximum PAR value of OFDM signal according to various embodiments of the present invention is educed to $1/\sqrt{L}$. When M=1, and L=N, the PAR value of the signal according to these embodiments is the same as the value of the conventional method for transmitting single carrier signals.

According to various embodiments of the present invention, when 1<M<N, the PAR of the signal can be further reduced if the conventional method for reducing the PAR of the signal is applied together.

In the paper "OFDM Codes for Peak-to-Average Power Reduction and Error Correction", proc. of Globecom '96, pp. 740–744, London, November 1996, N=16 and two 8-symbol complementary codes are interleaved. The PAR of the signal in the conventional OFDM system is 3 dB when N=8 and the 8-symbol complementary code is used, but 6.24 dB when N=16 and two 8-symbol complementary codes are used. However, according to embodiments of the present invention, when N=16, L=2 and M=8, the PAR of the signal is 3 dB, which is 3.24 dB less than that obtained using the conventional methods. In the conventional method for reducing the PAR of the signal using a code, when N is increased, the decoder of the receiving terminal becomes very complicated so that N must be small. However, according to various embodiments of the present invention, the symbol of the large N can be divided into L small symbols and the divided symbols can be coded.

In the U.S. Pat. Nos. 5,787,113 and 5,623,513 entitled "Mitigating Clipping and Quantization Effects in Digital Transmission Systems", when the peak power of the signal exceeds a predetermined clipping level, the total size of a corresponding OFDM symbol must be reduced, so that the power of the symbol must be reduced. In the method for reducing the PAR according to various embodiments of the present invention a block is divided to L*M-sized small blocks so that the size of part of the symbol is reduced and the reduction in power of the total signal is smaller than that of the conventional method. When information of signal reduction is detected from the receiving terminal and the method for reducing PAR according to various embodiments of the present invention is adopted, the information of signal reduction has an effect on corresponding blocks without having an effect on the total symbol.

Also, according to various embodiments of the present invention, the PAR can be reduced by adding pilot signals in the time domain to achieve channel estimation. Furthermore, a receiving apparatus inserts a virtual pilot tone in the frequency domain to reduce channel estimation error, so that a channel can be more accurately estimated.

What is claimed is:

1. A method for transmitting orthogonal frequency division multiplexing (OFDM) signals, the method comprising:
   (a) coding the OFDM signals;
   (b) forming a block of N coded data and dividing the block into L M-sized small blocks, where N, M and L indicate integers of 1 or more, and L=N/M, the N coded data forming the one block being expressed by $X_n$, where n=0,1, . . . ,N−1, each of the L small blocks $X_v^l$, where l=0,1, . . . ,L−1, being divided based on the relationship $X_v^l = X_{lM+v} = X_n$, n=lM+v, l=0,1, . . . ,L−1, v=0,1, . . . ,M−1;
   (c) M-point inverse fast Fourier transforming the L small blocks;
   (d) combining L M-point inverse fast Fourier transformed blocks, and generating an N-sized inversely-transformed block;
   (e) attaching a cyclic prefix to the N-sized inversely-transformed block; and
   (f) transforming the blocks having the attached cyclic prefix, into an analog signal and transmitting the transformed analog signal.

2. The method of claim 1, wherein when a signal obtained by M-point inverse fast Fourier transforming the code data $X_v^l$ of each small block, is $x_m^l$, the inversely-transformed blocks $x_k$, where k=0,1, . . . ,N−1, in step (d) are combined, corresponding to the Equation $$x_k = x_{lM+m} = x_m^l, k=lM+m, l=0,1, \ldots ,L-1, m=0,1, \ldots ,M-1.$$

3. The method of claim 1, wherein when a signal obtained by M-point inverse fast Fourier transforming code data $X_v^l$ of each small block is $x_m^l$, the inversely transformed block $x_k$, where k=0,1, . . . ,N−1, in step (d) is combined corresponding to the Equation $$x_k = x_{mL+l} = x_m^l, k=mL+l, l=0,1, \ldots ,L-1, m=0,1, \ldots ,M-1.$$

4. A method for receiving OFDM signals, comprising:
   (a) digitally converting received OFDM signals and obtaining a signal sample from the transformed signals;
   (b) detecting the starting point of an N-sized signal sample block from the signal samples, and removing a cyclic prefix;
   (c) dividing the signal sample block into L M-sized small blocks, where N, M and L are integers of 1 or more, and L=N/M;
   (d) M-point fast Fourier transforming the L small blocks;
   (e) combining the L M-point fast Fourier transformed small blocks, and generating an N-sized transform block, the N-sized transform block $Z_n$, where n=0,1, . . . ,N−1, being coupled based on the relationship $Z_n=Z_{lM+v}=W_v^l$, where $n=lM+v, l=0,1, \ldots L-1$, and $v=0,1, \ldots, M-1$, wherein an M-point fast Fourier transform of signal sample $\omega_m^l$ is $W_v^l$; and (f) detecting data from the N-sized transform block, and decoding the detected data.

5. The method of claim 4, wherein when N signal samples forming the signal sample block are expressed by $\omega_k$, where $k=0,1, \ldots, N-1$, each of the L small blocks $\omega_m^l$, where $l=0,1, \ldots, L-1$, is divided in correspondence to $\omega_m^l = \omega_{lM+m} = \omega_k$, where $k=lM+m, l=0,1, \ldots, L-1$, and $m=0,1, \ldots, M-1$, in step (c).

6. The method of claim 4, wherein when N signal samples forming the signal sample block are expressed by $\omega_k$, where $k=0,1, \ldots, N-1$, L small blocks $\omega_m^l$, where $l=0,1, \ldots, L-1$ are respectively divided in correspondence to $\omega_m^l = \omega_{mL+l} = \omega_k$, where $k=mL+l, l=0,1, \ldots, L-1$, and $m=0,1, \ldots, M-1$, in step (c).

7. A method for receiving OFDM signals, comprising:
(a) digitally converting received OFDM signals and obtaining a signal sample from the transformed signals;
(b) detecting the starting point of an N-sized signal sample block from the signal samples, and removing a cyclic prefix;
(b1) N-point fast Fourier transforming the N-sized signal sample block;
(b2) compensating the distortion due to a channel by multiplying the N-point fast Fourier transformed value in step (b1) by the tap coefficients of a frequency domain equalizer;
(b3) N-point inverse fast Fourier transforming N samples in which the distortion is compensated in step (b2);
(c) dividing the signal sample block into L M-sized small blocks, where N, M and L are integers of 1 or more, and $L=N/M$;
(d) M-point fast Fourier transforming the L small blocks;
(e) combining the L M-point fast Fourier transformed small blocks, and generating an N-sized transform block; and
(f) detecting data from the N-sized transform block, and decoding the detected data.

8. An apparatus for transmitting OFDM signals, comprising:
an encoder for encoding OFDM signals;
a transmission deinterleaver for forming N encoded code data into a block, and dividing the block into L M-sized small blocks, where N, M and L are integers of 1 or more, and $L=N/M$, the N code data forming the block being expressed by $X_n$, where $n=0,1, \ldots, N-1$, the signal transmission deinterleaver dividing each of the L small blocks $X_v^1$, where $l=0,1, \ldots, L-1$, based on the relationship $X_v^l = X_{lM+v} = X_n$, where $n=lM+v, l=0,1, \ldots, L-1$, and $v=0,1, \ldots, M-1$;
L M-point inverse fast Fourier transformers for M-point inverse fast Fourier transforming the L small blocks;
a signal transmission interleaver for combining L M-point inverse fast Fourier transformed small blocks, thereby generating an N-sized inverse transformed block;
a cyclic prefix adder for adding a cyclic prefix to the N-sized inversely transformed block; and
a digital-to-analog converter for analog-transforming the inversely-transformed block to which the cyclic prefix is added and transmitting the analog-transformed signal.

9. The apparatus of claim 8, wherein
when a signal obtained by M-point inverse fast Fourier transforming code data $X_v^l$ is $x_m^l$, the signal transmission interleaver couples the inversely transformed block $x_k$, where $k=0,1, \ldots, N-1$, in correspondence to the Equation $x_k = x_{lM+m} = x_m^l$, where $k=lM+m, l=0,1, \ldots, L-1$, and $m=0,1, \ldots, M-1$.

10. The apparatus of claim 8, wherein
when a signal obtained by M-point inverse fast Fourier transforming code data $X_v^l$ is $x_m^l$, the signal transmission interleaver couples the inversely transformed block $x_k$, where $k=0,1, \ldots, N-1$ in correspondence to Formula $x_k = x_{mL+l} = x_m^l$, where $k=mL+l, l=0,1, \ldots, L-1$, and $m=0,1, \ldots, M-1$.

11. An apparatus for receiving OFDM signals, comprising:
an analog-to-digital converter for obtaining signal samples by digital-converting received OFDM signals;
a cyclic prefix remover for finding the starting point of an N-sized signal sample block from the signal samples, and removing a cyclic prefix;
a signal receiving deinterleaver for dividing the signal sample block into L M-sized small blocks, where N, M and L are integers of 1 or more, and $L=N/M$;
L M-point fast Fourier transformers for M-point fast Fourier transforming the L small blocks;
a signal receiving interleaver for interleaving the L M-point fast Fourier transformed small blocks, thereby generating an N-sized transform block, the signal receiving interleaver coupling the N-sized transform block $Z_n, n=0,1, \ldots, N-1$ based on the relationship $Z_n = Z_{lM+v} = W_v^l$, where $n=lM+v, l=0,1, \ldots, L-1$, and $v=0,1, \ldots, M-1$, wherein an M-point fast Fourier transform of signal samples $\omega_m^l$ is $W_v^l$;
a detector for detecting data from the N-sized transform block; and
a decoder for decoding the detected data.

12. The apparatus of claim 11, wherein when N signal samples forming the signal sample block are expressed by $\omega_k$, where $k=0,1, \ldots, N-1$, the signal receiving deinterleaver divides each of the L small blocks $\omega_m^l$, where $l=0,1, \ldots, L-1$ in correspondence to Equation $\omega_m^l = \omega^{lM+m} = \omega_k$, where $k=lM+m, l=0,1, \ldots, L-1$, and $m=0,1, \ldots, M-1$.

13. The apparatus of claim 11, wherein when N signal samples forming the signal sample block are expressed by $\omega_k$, where $k=0,1, \ldots, N-1$, the signal receiving deinterleaver divides each of the L small blocks $\omega_m^l$, where $l=0,1, \ldots, L-1$ in correspondence to Equation $\omega_m^l = \omega_{mL+l} = \omega_k$, where $k=mL+l, l=0,1, \ldots, L-1$, and $m=0,1, \ldots, M-1$.

14. An apparatus for receiving OFDM signals, comprising:
an analog-to-digital converter for obtaining signal samples by digital-converting received OFDM signals;
a cyclic prefix remover for finding the starting point of an N-sized signal sample block from the signal samples, and removing a cyclic prefix;
an N-point fast Fourier transformer for N-point fast Fourier transforming an N-sized signal sample block in which a cyclic prefix is removed by the cyclic prefix remover;
a frequency domain equalizer for compensating for the distortion caused by a channel by multiplying the values transformed by the N-point fast Fourier transformer by the tap coefficients of the frequency domain equalizer;

an N-point inverse fast Fourier transformer for inversely transforming the N samples having distortion compensated for by the frequency domain equalizer and outputting the inversely transformed samples to a receiving deinterleaver;

a signal receiving deinterleaver for dividing the signal sample block into L M-sized small blocks, where N, M and L are integers of 1 or more, and L=N/M;

L M-point fast Fourier transformers for M-point fast Fourier transforming the L small blocks;

a signal receiving interleaver for interleaving the L M-point fast Fourier transformed small blocks, thereby generating an N-sized transform block;

a detector for detecting data from the N-sized transform block; and a decoder for decoding the detected data.

15. An apparatus for transmitting OFDM signals, the apparatus comprising:

a pre-processor for encoding an input data sequence and converting the encoded data to parallel data;

a block signal domain transformer for dividing the encoded data into blocks of predetermined sizes, inserting "0" at the first data position of each block, transforming each block into a time domain signal, and combining time domain signals;

a pilot signal adder for converting pilot tones, which are to be inserted at positions other than a predetermined position among the positions at which "0" has been inserted in the block signal domain transformer, into time domain pilot signals, and adding the pilot signals to the time domain signals output by the block signal domain transformer; and a post-processor for converting the resultant signals of the pilot signal adder to serial signals, adding a cyclic prefix to each of the converted signals, converting the resultant signals to analog signals, and transmitting the analog signals.

16. The apparatus of claim 15, wherein the block signal domain transformer comprises:

a transmission deinterleaver for dividing the encoded data into L M-sized blocks;

a "0" inserter for inserting "0" at the first position of each block;

an L×(M-IFFT) for performing inverse fast Fourier transformation on each block; and a transmission interleaver for combining the time domain signals with each other.

17. An apparatus for receiving OFDM signals, comprising:

a pre-processor for converting a received OFDM signal to a digital signal, removing a cyclic prefix from the digital signal, converting the resultant signal to parallel signals of predetermined sizes, and transforming each of the parallel signals to a frequency domain signal;

a channel estimator for inserting virtual pilot tones at predetermined positions of the frequency domain signal, extracting the virtual pilot tones and pilot tones added upon transmission, and estimating channel characteristics from the extracted virtual pilot tones and pilot tones;

an equalizer for compensating for distortion of the output signal of the pre-processor caused by a channel, according to the estimated channel characteristics;

an intermediate processor for converting the output signal of the equalizer to a time domain signal and removing pilot signals from the time domain signal;

a signal domain transformer for transforming the output signal of the intermediate processor to a frequency domain signal; and a post-processor for detecting transmission data from the frequency domain signal, converting the detected data to serial data, and decoding the serial data.

18. The apparatus of claim 17, wherein the channel estimator comprises:

a pilot tone extractor for extracting the pilot tones from the frequency domain signal;

a virtual pilot tone inserter for making a virtual pilot tone from the extracted pilot tones and inserting the virtual pilot tone at predetermined positions of the frequency domain signal;

a transform domain converter for fast Fourier transforming the extracted pilot tones and virtual pilot tone to a transform domain signal;

an adaptive low pass filter for removing pilot tones whose amplitudes are less than or equal to a predetermined level, among the pilot tones of the transform domain;

a "0" padder for padding positions from which pilot tones are removed with "0"; and a frequency domain transformer for transforming the output signal of the "0" padder to a frequency domain signal.

19. The apparatus of claim 18, wherein the virtual pilot tone inserter obtains the average of the second pilot tone and the last pilot tone among the extracted pilot tones from the pilot tone extractor and inserts the obtained average into the position of the first pilot tone.

20. The apparatus of claim 17, wherein the signal domain transformer comprises:

a receiving deinterleaver for dividing a time domain signal into L M-sized blocks;

an L×(M-FFT) for performing fast Fourier transformation on each block; and a receiving interleaver for combining signals that have been transformed to frequency domain signals.

21. A method of transmitting OFDM signals, comprising:

(a) encoding an input data sequence, and converting encoded data to parallel data;

(b) dividing the encoded data into blocks of predetermined sizes and inserting "0" at the first position of each block;

(c) transforming each block to which "0" is inserted, to a time domain signal, and combining the time domain signals;

(d) transforming pilot tones, which are to be inserted at positions other than a predetermined position among the positions at which "0" has been inserted, into time domain pilot signals, and adding each of the pilot signals to the time domain signal of each block; and (e) converting the resultant signal of the step (d) to a serial signal, adding a cyclic prefix to the converted signal, converting the resultant signal to an analog signal, and transmitting the analog signal.

22. The method of claim 21, wherein when the decoded data is expressed by $X_n$, where $n=0,1,\ldots,N-1$, the predetermined sized blocks $X_v^l$, where $l=0,1,\ldots,L-1$ and $v=0,1,\ldots,M-1$, in step (b) are respectively divided corresponding to the Equation $$X_v^l = X_{lM+v} = X_n, \text{ where } n=lM+v, l=0,1,\ldots,L-1, \text{ and } v=0,1,\ldots,M-1,$$

and when a time domain signal to which data $X_v^l$ per block is converted, is $x_m^l$, the signals $x_k$, where k=0,1,...,N−1 in step (c) are combined, corresponding to the Equation:

$$x_k = x_{lM+m} = x_m^l, \text{ where } k=lM+m, l=0,1,...,L-1, \text{ and } m=0,1,...,M-1.$$

23. The method of claim 21, wherein when the decoded data is expressed by $X_n$, where n=0,1,...,N−1, each of the predetermined sized blocks $X_v^l$, where l=0,1,...,L−1 is divided corresponding to the Equation:

$$X_v^l = X_{lM+v} = X_n, \text{ where } n=lM+v, l=0,1,...,L-1, \text{ and } v=0,1,...,M-1,$$

and when a time domain signal to which data $X_v^l$ of each block is converted is $x_m^l$, the combined signals $x_k$, k=0,1,...,N−1 in step (c) are combined corresponding to the Equation:

$$x_k = x_{mL+l} = x_m^l, \text{ where } k=mL+l, l=0,1,...,L-1, \text{ and } m=0,1,...,M-1.$$

24. A method of receiving OFDM signals, comprising:
   (a) converting a received signal into a digital signal, removing a cyclic prefix from the digital signal, converting the resultant signal into parallel signals of predetermined sizes, and converting each parallel signal to a frequency domain signal;
   (b) inserting a virtual pilot tone at predetermined positions of the frequency domain signal and extracting the virtual pilot tone and pilot tones added upon transmission;
   (c) estimating channel characteristics from the extracted virtual pilot tone and pilot tones;
   (d) compensating for distortion caused by a channel with respect to the frequency domain signal, according to the estimated channel characteristics;
   (e) transforming a distortion-compensated signal into a time domain signal and removing pilot signals from the time domain signal; and
   (f) detecting transmission data by transforming the resultant signals of the step (e) to a frequency domain signal, and converting the detected transmission data to serial data and decoding the serial data.

25. The method of claim 24, wherein the step (c) comprises:
   (c1) inserting the virtual pilot tone at predetermined positions of the frequency domain signal;
   (c2) extracting pilot tones and the virtual pilot tone from the frequency domain signal;
   (c3) converting the extracted pilot tones and the extracted virtual pilot tone to a transform domain signal, and removing pilot signals in the transform domain, the amplitude of each is less than or equal to a predetermined level, among the pilot signals of the transform domain;
   (c4) padding positions from which the pilot signals of the transform domain are removed, with "0"; and
   (c5) transforming the resultant signal of the step (c4) to a frequency domain signal.

26. The method of claim 25, wherein the virtual pilot tone in the step (c1) is inserted at the position of the first pilot tone, and the virtual pilot tone has an amplitude which is the average of the second pilot tone and the last pilot tone among the extracted pilot tones.

27. The method of claim 24, wherein the conversion of the resultant signal of the step (e) to a frequency domain signal in step (f) comprises:
   dividing the resultant signal of the step (e) into L M-sized blocks;
   performing M-point fast Fourier transformation on each block; and
   combining the resultant signals of the above step.

28. The method of claim 27, wherein when N signal samples forming each block are expressed by $\omega_k$, where k=0,1,...,N−1, each of the L blocks $\omega_m^l$, where l=0,1,..., L−1 and m=0,1,...,M−1, is divided in correspondence to $\omega_m^l = \omega_{lM+m} = \omega_k$, where k=lM+m, l=0,1,...,L−1, and m=0,1,...,M−1, in step (f1), and
   when a signal obtained by M-point fast Fourier transforming the signal sample $\omega_m^l$ is $W_v^l$, the resultant signal $Z_n$, where n=0,1,...,N−1, of the step (f2) is coupled corresponding to $Z_n = Z_{lM+v} = W_v^l$, where n=lM+v, l=0,1,...L−1, and v=0,1,...,M−1.

29. The method of claim 27, wherein signal samples forming blocks are expressed by $\omega_k$, where k=0,1,...,N−1, each of the L blocks $\omega_m^l$, where l=0,1,...,L−1, and m=0,1,...,M−1, is divided in correspondence to $\omega_m^l = \omega_{mL+l} = \omega_k$, where k=mL+l, l=0,1,...,L−1, and m=0,1,...,M−1, in step (f1), and
   when a signal obtained by M-point fast Fourier transforming the signal sample $\omega_m^l$ is $W_v^l$, the resultant signal $Z_n$ where n=0,1,...,N−1 of step (f3) is coupled in correspondence to $Z_n = Z_{lM+v} = W_v^l$, where n=lM+v, l=0,1,..., L−1, and v=0,1,...,M−1.

* * * * *